(12) United States Patent
Guo et al.

(10) Patent No.: US 9,261,753 B2
(45) Date of Patent: Feb. 16, 2016

(54) SPECTRUM FILTERING FOR VISUAL DISPLAYS AND IMAGING HAVING MINIMAL ANGLE DEPENDENCE

(75) Inventors: Lingjie Jay Guo, Ann Arbor, MI (US); Ting Xu, Ann Arbor, MI (US)

(73) Assignee: The Regents Of The University of Michigan, Ann Arbor, MI (US)

( * ) Notice: Subject to any disclaimer, the term of this patent is extended or adjusted under 35 U.S.C. 154(b) by 674 days.

(21) Appl. No.: 13/452,313

(22) Filed: Apr. 20, 2012

(65) Prior Publication Data
US 2012/0268809 A1    Oct. 25, 2012

Related U.S. Application Data

(60) Provisional application No. 61/477,554, filed on Apr. 20, 2011.

(51) Int. Cl.
| | |
|---|---|
| *G02B 5/28* | (2006.01) |
| *G02F 1/21* | (2006.01) |
| *G02B 5/20* | (2006.01) |
| *G02F 1/1335* | (2006.01) |

(52) U.S. Cl.
CPC ............ *G02F 1/216* (2013.01); *G02B 5/201* (2013.01); *G02B 5/288* (2013.01); *G02F 2001/133521* (2013.01); *G02F 2001/213* (2013.01); *G02F 2201/346* (2013.01); *G02F 2202/30* (2013.01); *G02F 2202/32* (2013.01)

(58) Field of Classification Search
None
See application file for complete search history.

(56) References Cited

U.S. PATENT DOCUMENTS

| | | | |
|---|---|---|---|
| 5,381,232 A | 1/1995 | van Wijk | |
| 5,570,139 A | 10/1996 | Wang | |
| 5,986,808 A | 11/1999 | Wang | |
| 6,031,653 A * | 2/2000 | Wang | ............................ 359/247 |
| 6,046,401 A | 4/2000 | McCabe | |
| 6,097,456 A * | 8/2000 | Wang | ............................ 349/105 |
| 6,317,264 B1 * | 11/2001 | Li et al. | ..................... 359/485.03 |

(Continued)

FOREIGN PATENT DOCUMENTS

| | | |
|---|---|---|
| CN | 101063726 A | 10/2007 |
| EP | 1571467 A2 | 9/2005 |

(Continued)

OTHER PUBLICATIONS

Xu, T. et al., Plasmonic nanoresonators for high-resolution colour filtering and spectral imaging, Nature Communications 1, Article 59, published Aug. 24, 2010.*

(Continued)

*Primary Examiner* — Derek S Chapel
(74) *Attorney, Agent, or Firm* — Harness, Dickey & Pierce, PLC

(57) ABSTRACT

An optical spectrum filtering device, e.g., color filter, having reduced angle dependence is provided that comprises an interference filter assembly comprising a high refractive index dielectric material, such as a Fabry-Perot based resonator structure. The filter assembly is capable of transmitting a portion of an electromagnetic spectrum into the dielectric material to generate a filtered output with a predetermined range of wavelengths that displays minimal angle dependence, when viewed from a range of incidence angles ranging from normal (0°) to 90°. Methods of making minimal angle dependent optical spectrum filters and reducing angle dependence for such devices are also provided.

24 Claims, 20 Drawing Sheets

(56) References Cited

U.S. PATENT DOCUMENTS

| | | | |
|---|---|---|---|
| 6,807,342 B2 | 10/2004 | Fan | |
| 6,924,859 B2 | 8/2005 | Ishii et al. | |
| 6,992,826 B2 | 1/2006 | Wang | |
| 7,106,402 B2 | 9/2006 | Suzuki et al. | |
| 7,248,297 B2 | 7/2007 | Catrysse et al. | |
| 7,648,767 B2 | 1/2010 | Fu et al. | |
| 7,649,597 B2 | 1/2010 | Ikeno et al. | |
| 7,734,131 B2 | 6/2010 | Lin et al. | |
| 7,916,301 B2 | 3/2011 | Dahlgren | |
| 8,130,440 B2 | 3/2012 | Kothari et al. | |
| 8,547,504 B2 | 10/2013 | Guo et al. | |
| 8,848,140 B2 | 9/2014 | Guo et al. | |
| 2006/0014761 A1 | 1/2006 | Morgan et al. | |
| 2006/0147617 A1 | 7/2006 | Chen et al. | |
| 2006/0205107 A1 | 9/2006 | Inaba et al. | |
| 2006/0262250 A1 | 11/2006 | Hobbs | |
| 2006/0262253 A1 | 11/2006 | Teramoto et al. | |
| 2006/0286663 A1 | 12/2006 | Cunningham et al. | |
| 2007/0019292 A1 | 1/2007 | Kim et al. | |
| 2007/0102035 A1 | 5/2007 | Yang et al. | |
| 2009/0046362 A1 | 2/2009 | Guo et al. | |
| 2009/0219623 A1 | 9/2009 | Shalaev et al. | |
| 2009/0256287 A1 | 10/2009 | Fu et al. | |
| 2010/0002979 A1 | 1/2010 | Diest et al. | |
| 2010/0091217 A1 | 4/2010 | Kim et al. | |
| 2010/0315579 A1 | 12/2010 | Huang | |
| 2011/0019139 A1 | 1/2011 | Cui et al. | |
| 2011/0085238 A1* | 4/2011 | Minemura et al. | 359/489.01 |
| 2012/0086887 A1 | 4/2012 | Lee et al. | |
| 2012/0268809 A1 | 10/2012 | Guo et al. | |
| 2012/0287362 A1 | 11/2012 | Hashimura et al. | |
| 2014/0268332 A1 | 9/2014 | Guo et al. | |

FOREIGN PATENT DOCUMENTS

| | | |
|---|---|---|
| JP | H11-295725 A | 10/1999 |
| JP | 2000/111851 A | 4/2000 |
| JP | 2007/025692 A | 2/2007 |
| JP | 2009/500832 A | 1/2009 |
| JP | 2009/145742 A | 7/2009 |
| JP | 2009/169213 A | 7/2009 |
| JP | 2010/008990 A | 1/2010 |
| WO | WO 2011026942 A2 * | 3/2011 |
| WO | 2011/112714 A2 | 9/2011 |
| WO | 2011/139785 A2 | 11/2011 |
| WO | 2012/145677 A2 | 10/2012 |

OTHER PUBLICATIONS

Xu et al., Nanostructured metal-insulator-metal resonators for high-resolution color filtering and spectral imaging, SPIE vol. 7946, published Feb. 28, 2011.*

Barnes, William L., et al., "Surface plasmon subwavelength optics," Nature, vol. 424, pp. 824-830 (Aug. 14, 2003).

Chen, Qin, et al., "High transmission and low color cross-talk plasmonic color filters using triangular-lattice hole arrays in aluminum films," Optics Express, vol. 18, No. 13, pp. 14056-14062 (Jun. 21, 2010) (published online Jun. 15, 2010).

Diest, Kenneth, et al., "Tunable Color Filters Based on Metal?Insulator?Metal Resonators," Nano Letters, vol. 9, No. 7, pp. 2579-2583 (2009) (published online Jun. 15, 2009).

Ebbesen, T.W., et al., "Extraordinary optical transmission through sub-wavelength hole arrays," Nature, vol. 391, pp. 667-669 (Feb. 12, 1998).

Genet, C., et al., "Light in tiny holes," Nature, vol. 445, pp. 39-46 (Jan. 4, 2007).

Inoue, Daisuke, et al., "Polarization independent color filter comprising an aluminum film with surface-plasmon enhanced transmission through a subwavelength array of holes," Applied Physics Letters, vol. 98, No. 9, pp. 093113-093115 (2011) (published online Mar. 2, 2011).

Laux, Eric, et al., "Plasmonic photon sorters for spectral and polarimetric imaging," Nature Photonics, vol. 2, pp. 161-164 (2008) (published online Feb. 24, 2008).

Lee, Hong-Shik, et al., "Color filter based on a subwavelength patterned metal grating," Optics Express, vol. 15, No. 23, pp. 15457-15463 (Nov. 12, 2007) (published online Nov. 6, 2007).

Lezec, H.J., et al., "Beaming Light from a Subwavelength Aperture," Science, vol. 297, pp. 820-822 (Aug. 2, 2002) (published online Jun. 20, 2002).

Li, Zili, et al., "14.3: Photovoltaic Cell Integrated into a Reflective LCD," Society for Information Display Symposium Digest of Technical Papers, vol. 33, No. 1, pp. 190-193 (May 2002).

Nguyen-Huu, Nghia, et al., "Color filters featuring high transmission efficiency and broad bandwidth based on resonant waveguide-metallic grating," Optics Communications, vol. 284, No. 10-11, pp. 2473-2479 (May 15, 2011).

Shen, J.T., et al., "Mechanism for Designing Metallic Metamaterials with a High Index of Refraction," Physical Review Letters, vol. 94, No. 19, pp. 197401-1-197401-4 (May 17, 2005).

Thio, Tineke, et al., "Enhanced light transmission through a single subwavelength aperture," Optics Letters, vol. 26, No. 24, pp. 1972-1974 (2001).

Wang, Yu, "Liquid crystal display efficiency enhancement using low-absorption color filters and color recyling," http://trs-new.jpl.nasa.gov/dspace/bitstream/2014/16461/1/00-2514.pdf (downloaded on May 13, 2013).

Xu, Ting, et al., "Plasmonic nanoresonators for high-resolution colour filtering and spectral imaging," Nature Communications, vol. 1, p. 1058 (Aug. 24, 2010).

Xue, Yinfei, et al., "Compound polarized wavelength filters with a single subwavelength structure," Optics Communications, vol. 284, No. 1, pp. 501-509 (Jan. 1, 2011).

Ye, Yan, et al., "Color filter based on a submicrometer cascaded grating," Optics Communications, vol. 283, No. 4, pp. 613-616 (Feb. 15, 2010).

Ye, Yan, et al., "Polarizing color filter based on a subwavelength metal-dielectric grating," Applied Optics, vol. 50, No. 10, pp. 1356-1363 (Apr. 1, 2011).

Yoon, Yeo-Taek, et al., "Color filter incorporating a subwavelength patterned grating in poly silicon," Optics Express, vol. 16, No. 4, pp. 2374-2380 (Feb. 18, 2008) (published online Feb. 5, 2008).

International Search Report and Written Opinion of the International Searching Authority issued on Dec. 21, 2011 for PCT International Application No. PCT/US2011/034174 (Pub. No. WO 2011/139785).

International Preliminary Report on Patentability issued on Oct. 30, 2012 for PCT International Application No. PCT/US2011/034174 (Pub. No. WO 2011/139785).

International Search Report and Written Opinion of the International Searching Authority issued on Nov. 28, 2012 for PCT International Application No. PCT/US2012/034526 (Pub. No. WO 2012/145677).

International Preliminary Report on Patentability issued on Oct. 22, 2013 for PCT International Application No. PCT/US2012/034526 (Pub. No. WO 2012/145677).

First Office Action and Search Report issued by the Patent Office of the People's Republic of China on Jun. 3, 2014 for Chinese Patent Application No. 201180021224.5, translation provided by Unitalen.

Office Action issued on Jan. 13, 2015 in Japanese Application No. 2013-508221.

R. Ortuno et al., "Midinfrared filters based on extraordinary optical transmission through subwavelength structured gold films", J. Appl. Phys., 2009, vol. 106, pp. 124313-1-124313-6.

Second Office Action issued on Feb. 25, 2015 for Chinese Application No. 201180021224.5, translation provided by Unitalen.

First Office Action issued on Apr. 28, 2015 for Chinese Application No. 201280024695.6.

Supplementary Partial European Search Report issued on Feb. 2, 2015 in European Application No. 12773766.6.

Honda, Tohru, et al., "Fabrication of a ZnSe-Based Vertical Fabry-Perot Cavity Using SiO2/TiO2 Multilayer Reflectors and Resonant Emission Characteristics," Jpn. J. Appl. Phys., vol. 33, pp. 3960-3961 (Jul. 1994).

Yoon, Yeo-Taek, et al., "Transmission Type Color Filter Incorporating a Silver Film Based Etalon," Optics Express, vol. 18, No. 5, pp. 5344-5349, Mar. 1, 2010.

(56) References Cited

OTHER PUBLICATIONS

Patel, J.S., et al., "Electrically Tunable Optical Filter for Infrared Wavelength Using Liquid Crystals in a Fabry-Perot Etalon," Appl. Phys. Lett., vol. 57, No. 17, pp. 1718-1720, Oct. 22, 1990.
Zhang et al., "Novel Tunable Liquid Crystal Fabry-Perot Filters for Fiber-Optical Systems," Prog. SPIE. 0277 (2001).
Kaplan et al, "High Efficiency Resonance-Based Color Filters with Tunable Transmission Bandwidth Fabricated Using Nanoimprint Lithography," Appl. Phys. Lett. 99, 143111, 2011.
Sinclair, Douglas, "Scanning Spherical-Mirror Interferometers for the Analysis of Laser Mode Structures," Spectra-Physics Laser Technical Bulletin No. 6, pp. 1-8, Apr. 1968.

\* cited by examiner

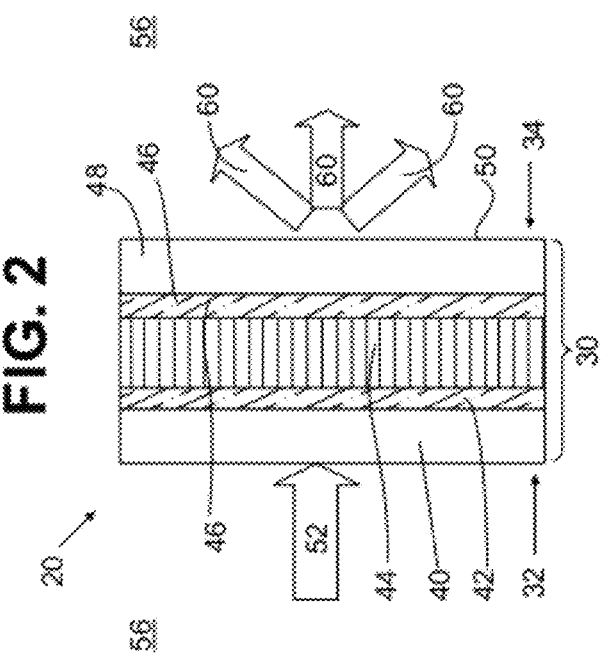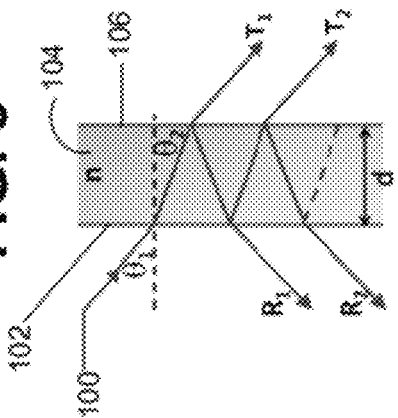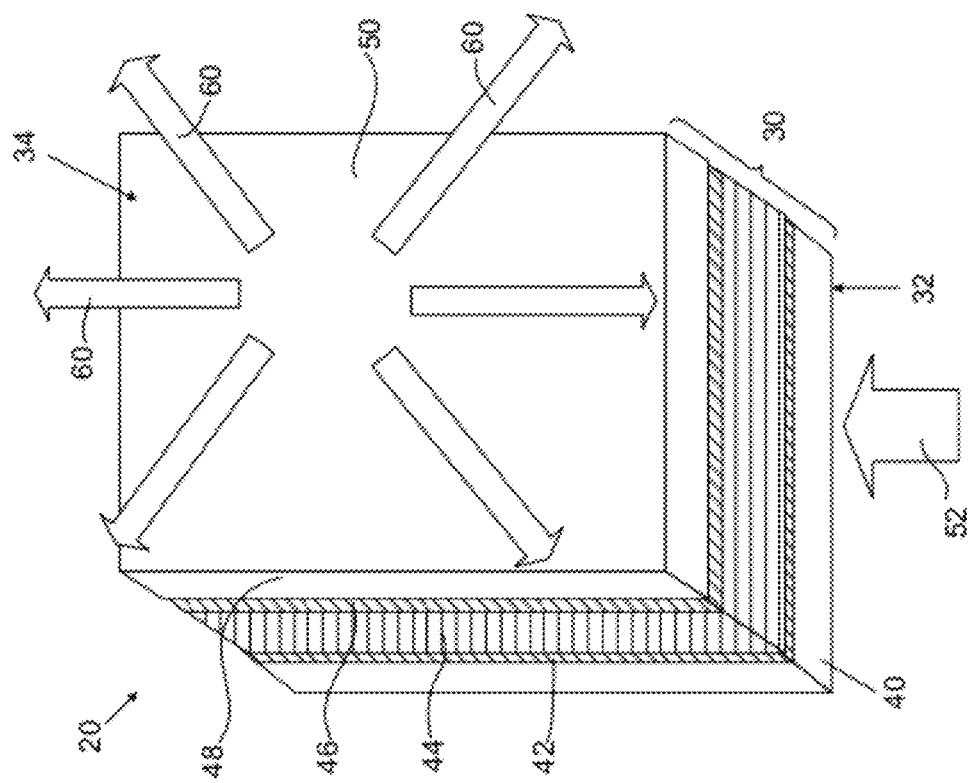

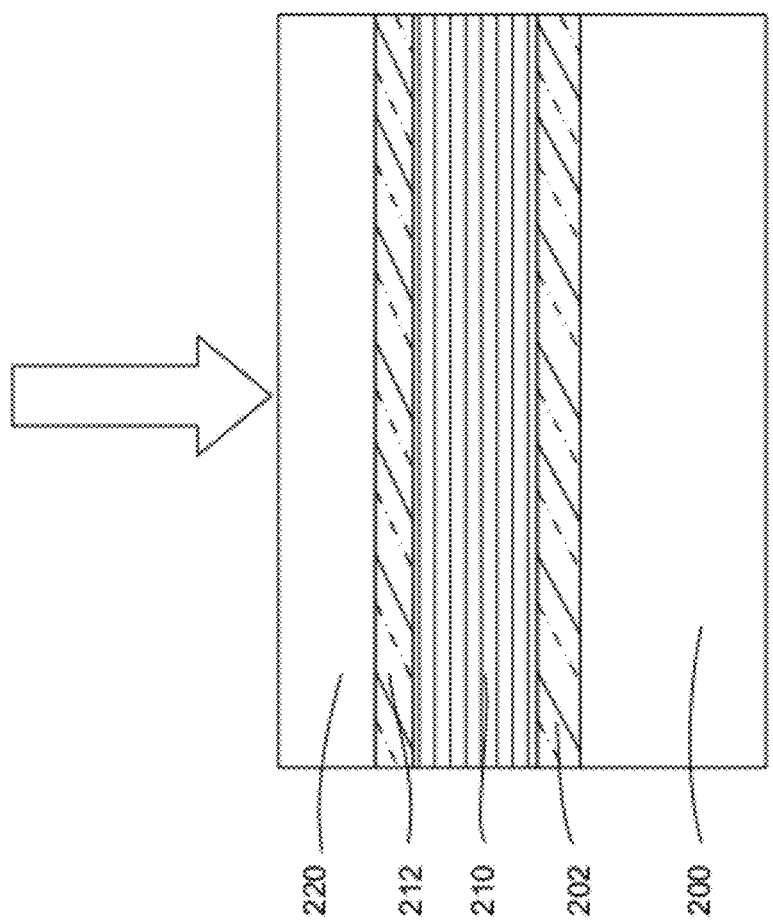

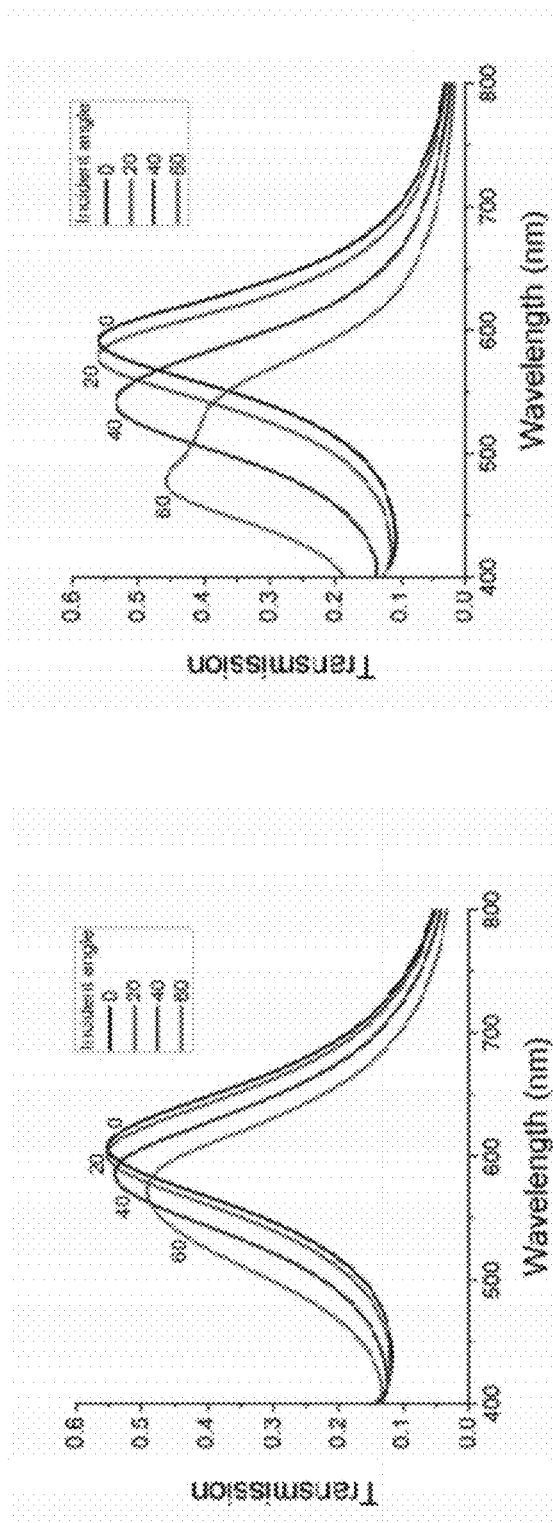

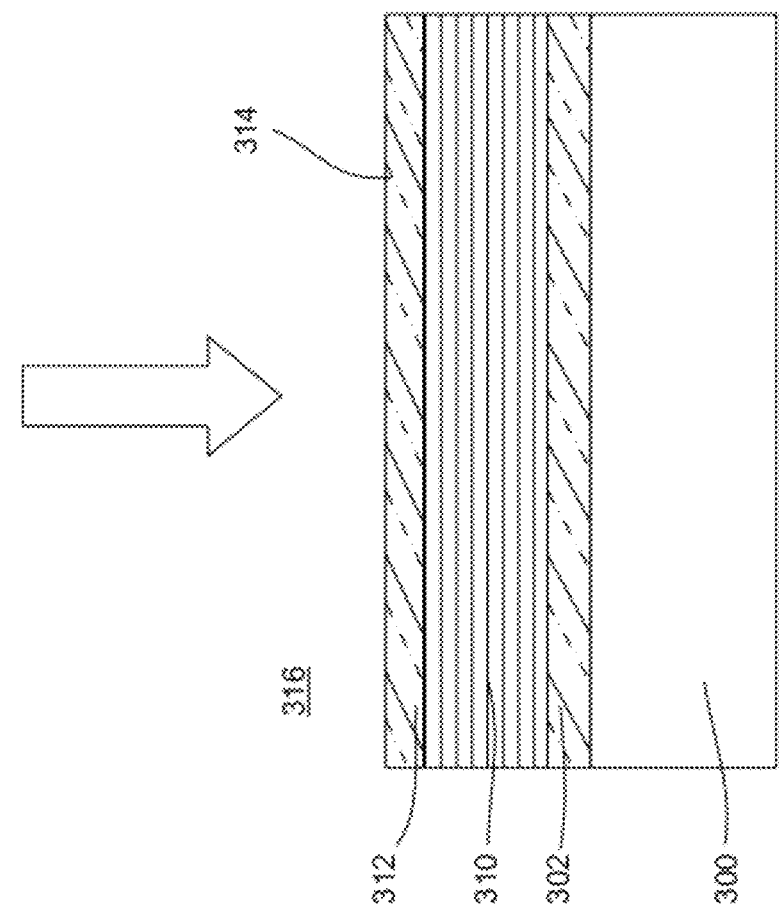

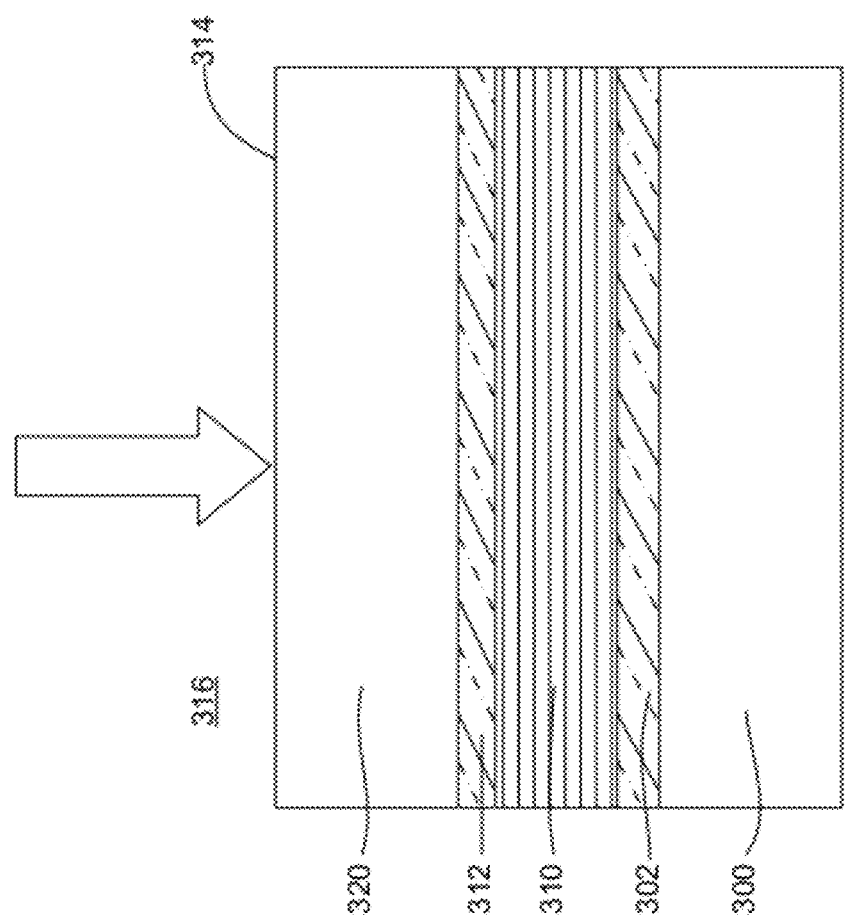

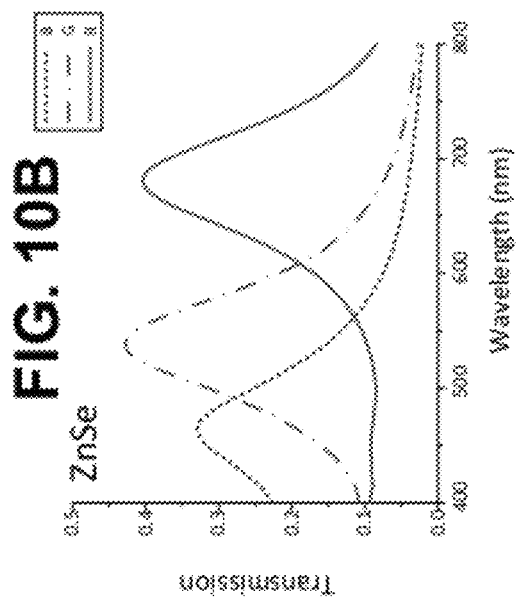
FIG. 10B
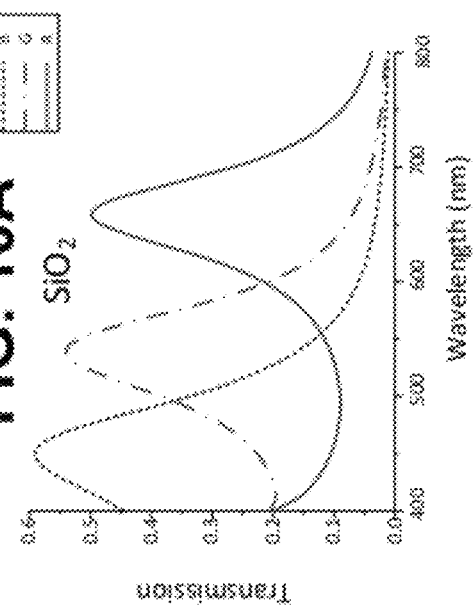
FIG. 10A
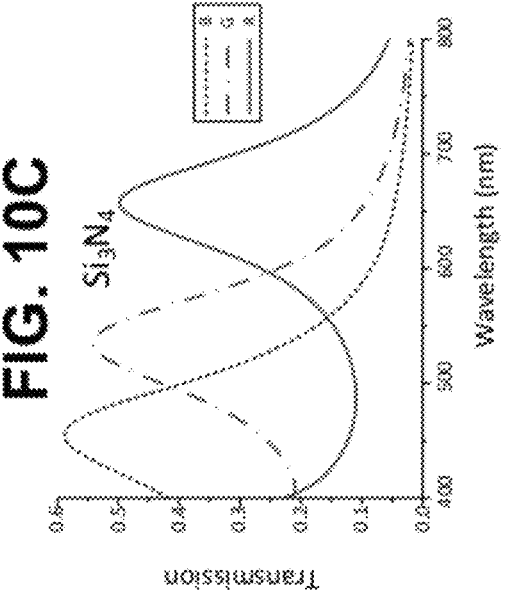
FIG. 10C
FIG. 10D
|  | Blue | Green | Red |
|---|---|---|---|
| SiO₂ | 100nm | 130nm | 170nm |
| Si₃N₄ | 60nm | 80nm | 110nm |
| ZnSe | 30nm | 50nm | 80nm |

|  | Yellow | Magenta | Cyan |
|---|---|---|---|
| SiO$_2$ | 100nm | 130nm | 170nm |
| Si$_3$N$_4$ | 60nm | 80nm | 110nm |
| ZnSe | 30nm | 50nm | 80nm |

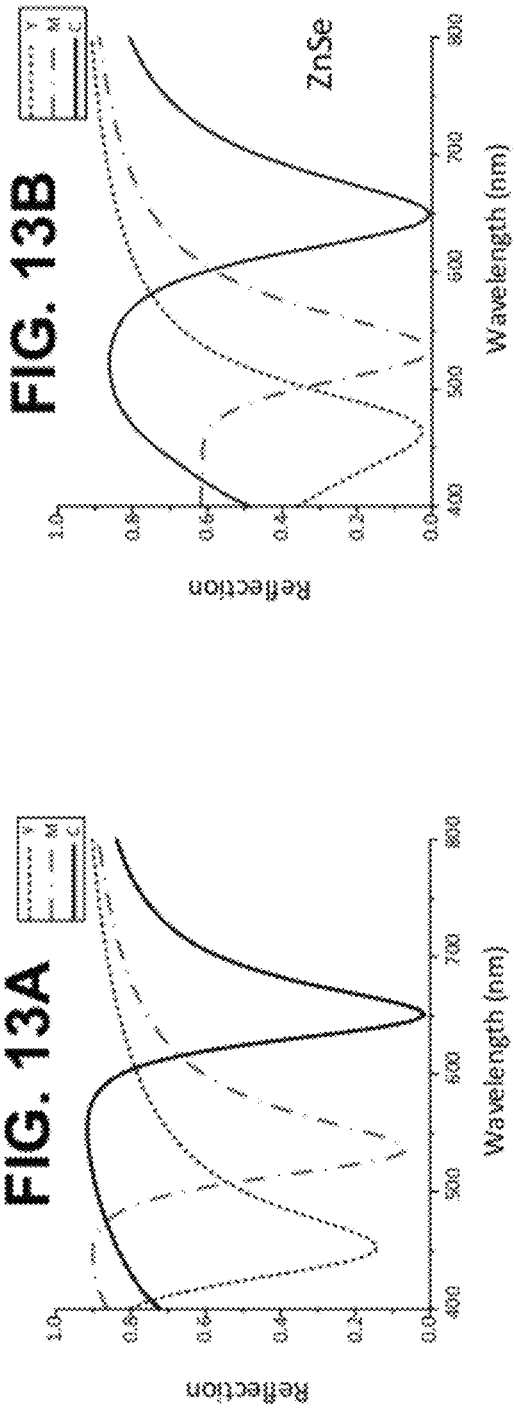
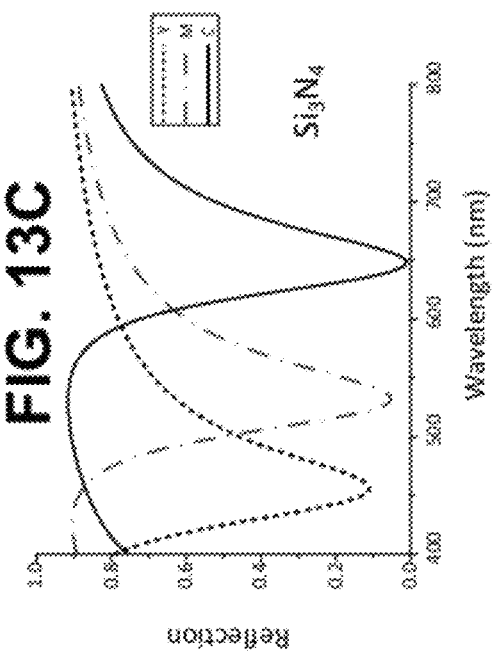
FIG. 13A  FIG. 13B  FIG. 13C  FIG. 13D

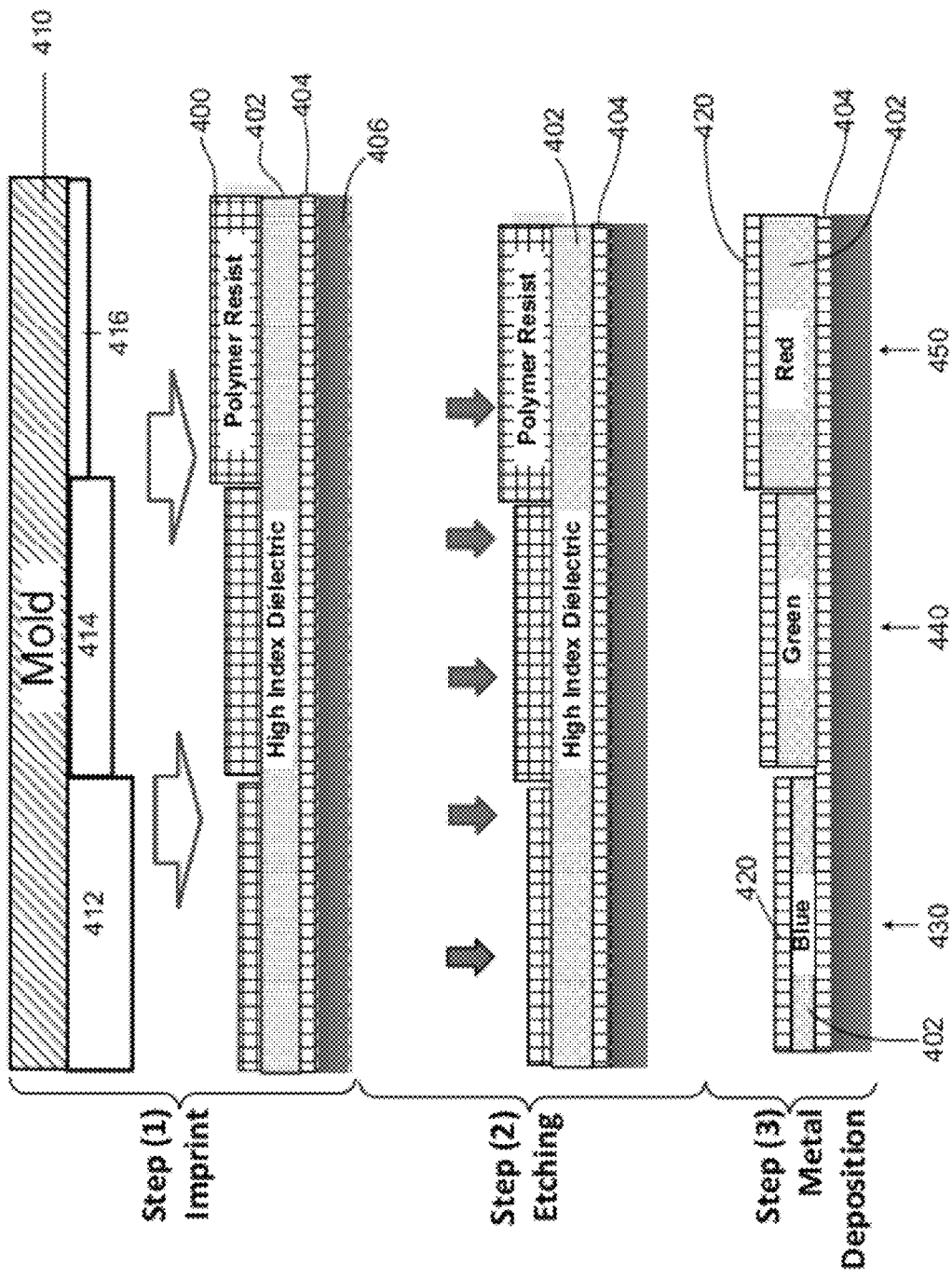

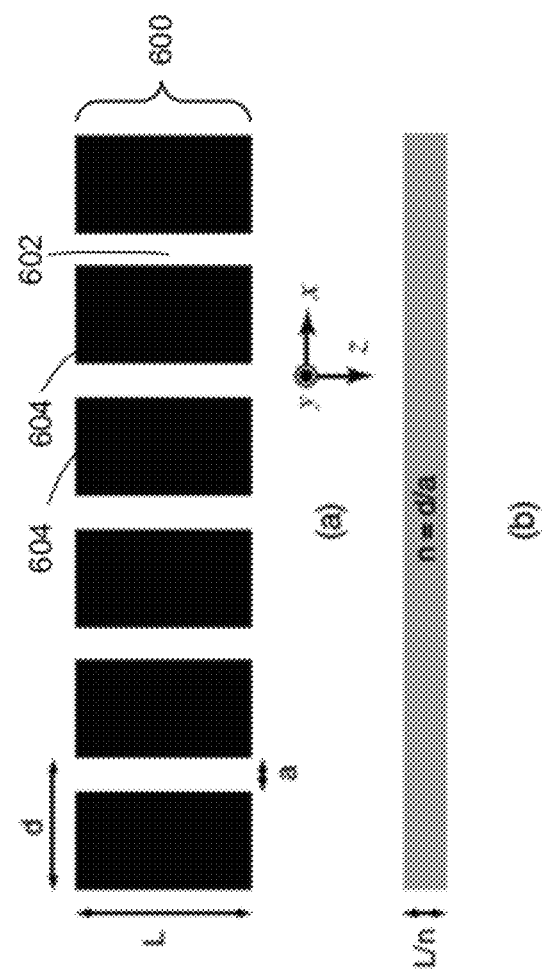

SPECTRUM FILTERING FOR VISUAL DISPLAYS AND IMAGING HAVING MINIMAL ANGLE DEPENDENCE

CROSS-REFERENCE TO RELATED APPLICATIONS

This application claims the benefit of U.S. Provisional Application No. 61/477,554, filed on Apr. 20, 2011. The entire disclosure of the above application is incorporated herein by reference.

GOVERNMENT RIGHTS

This invention was made with government support under CMMI1000425 awarded by the National Science Foundation. The government has certain rights in the invention.

FIELD

The present disclosure relates to optical spectrum filters for visual displays, such as Fabry-Perot based optical spectrum filters, having minimal angle dependence from a viewing direction. The present disclosure also relates to methods of making such optical spectrum filters having minimal angle dependence.

BACKGROUND

This section provides background information related to the present disclosure which is not necessarily prior art.

Electromagnetic spectrum filters, such as color filters, are an important component for various display technologies, including flat panel displays, liquid crystal displays, projection displays, eye-wear displays, complementary metal-oxide-semiconductor (CMOS) image sensors, light emitting diodes, and the like. For example, transmissive optical spectrum filters are widely utilized in applications such as liquid crystal display (LCD) panels. Conventional optical filters use pigment dispersions to produce red-green-blue (RGB) colors by absorbing complementary colors.

However, such conventional optical pigment-based filters are manufactured by four separate processes, which not only complicates the manufacturing process and increases cost, but also wastes significant chemical materials in the process. While Fabry-Perot based etalon color filters have been proposed, the conventional Fabry-Perot based filter still presents issues regarding undesirable angle dependence, meaning that the filtered light wavelength exiting the filter device suffers from a significant shift of wavelength and therefore color shift, depending upon the viewing angle. Such angle dependence is undesirable in various imaging and display applications.

Accordingly, there is a need for a new spectrum filter technology, like a color filter, that can produce optical filters in the visible or near infrared range, for example, with high transmission efficiency and with minimal angle dependence, as well as reduced manufacturing complexity.

SUMMARY

This section also provides a general summary of the disclosure, and is not a comprehensive disclosure of its full scope or all of its features. According to the principles of the present teachings, an optical spectrum filtering device is provided that has minimized angle dependence. The present technology provides a metal-dielectric-metal resonator structure that realizes spectrum filtering function for both transmission and reflection types. By tuning the dielectric layer thickness, the transmission or reflection peak covers a range of predetermined wavelengths, such as the visible or near-infrared (near-IR) ranges. In certain aspects, different color pixels can be fabricated by a printing technique using a mold with varied pattern depth. It can be combined with an etching technique to transfer the thickness contrast to any desired dielectric layer.

In certain aspects, the present disclosure provides an optical spectrum filtering device that comprises an interference filter assembly. The interference filter assembly comprises a dielectric material having a refractive index of greater than about 1.5 disposed between a pair of parallel reflective surfaces. Each reflective surface optionally comprises a metal. The filter assembly is capable of transmitting a portion of an electromagnetic spectrum to generate a filtered output having a predetermined range of wavelengths that desirably displays minimal angle dependence.

In other aspects, the present disclosure provides an optical spectrum filtering device comprising an interference filter assembly. The interference filter assembly comprises a dielectric material having a refractive index of greater than about 1.5 disposed between a pair of parallel reflective surfaces. Each reflective surface comprises a metal. The filter assembly is capable of transmitting a portion of an electromagnetic spectrum into the dielectric material to generate a filtered output having a predetermined range of wavelengths that exits the filter assembly, where the filtered output has a predetermined range of wavelengths and displays minimal angle dependence so that the predetermined range of wavelengths varies less than or equal to about 50 nm from an incidence angle of 0 to an incidence angle of 90°.

In yet other aspects, the present disclosure provides an optical spectrum filtering device that comprises an interference filter assembly comprising a high refractive index dielectric material disposed between a pair of parallel reflective surfaces. Each reflective surface optionally comprises a distributed Bragg Reflector (DBR) or 1-dimensional photonic crystals. Such a filter assembly is capable of transmitting a portion of an electromagnetic spectrum into the dielectric material to generate a filtered output having a predetermined range of wavelengths that exits the filter assembly. The filtered output from the filter assembly has a predetermined range of wavelengths and displays minimal angle dependence.

In other aspects, the present teachings provide a method of making an optical spectrum filtering device having minimal angle dependence. The method comprises applying a polymeric resist material to a dielectric material having a refractive index of greater than about 1.5 and in certain variations, optionally greater than about 2. The polymeric resist is then contacted with a mold having a predetermined height. The polymeric resist and dielectric material are then etched. A metal can be applied over the remaining dielectric material to form an interference filter assembly comprising the dielectric material disposed between a pair of parallel reflective surfaces. In certain variations, the dielectric material has an effective refractive index of greater than or equal to about 2. A filtered output from the interference filter assembly generates a predetermined range of wavelengths that displays minimal angle dependence.

In other aspects, methods of reducing angle dependence of an optical spectrum filtering device are provided by the present teachings. In one variation, the method comprises incorporating a dielectric material having a refractive index of greater than about 1.5 into an interference filter assembly comprising a pair of parallel reflective surfaces. Each reflective surface comprises a metal. Thus, the filter assembly generates a filtered output having a predetermined range of wavelengths that deviate less than or equal to 50 nm when the filter assembly is observed from incidence angles ranging from 0 to 90°.

In other aspects, the present disclosure also provides an optical spectrum filtering device. The optical spectrum filtering device comprises a resonance filter assembly that displays minimal angle dependence. In certain variations, a resonance filter assembly that displays minimal angle dependence comprises a resonator structure comprising an electrically conductive metal grating structure that forms an optical metamaterial. The electrically conductive metal grating structure comprises at least two openings. In certain aspects, the at least two openings may be subwavelength. In certain variations, the resonator structure optionally comprises a dielectric material embedded in the openings. The optical spectrum filtering device is capable of transmitting a portion of an electromagnetic spectrum to generate a filtered and polarized output having a predetermined range of wavelengths via optical resonance.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a perspective view of an exemplary optical filter assembly prepared in accordance with certain aspects of the present teachings;

FIG. 2 is a sectional-view taken along line 2-2 of FIG. 1 of the exemplary optical filter assembly;

FIG. 3 shows a schematic of operational principles of a Fabry-Perot based etalon interference filter;

Figures 4A, 4B:
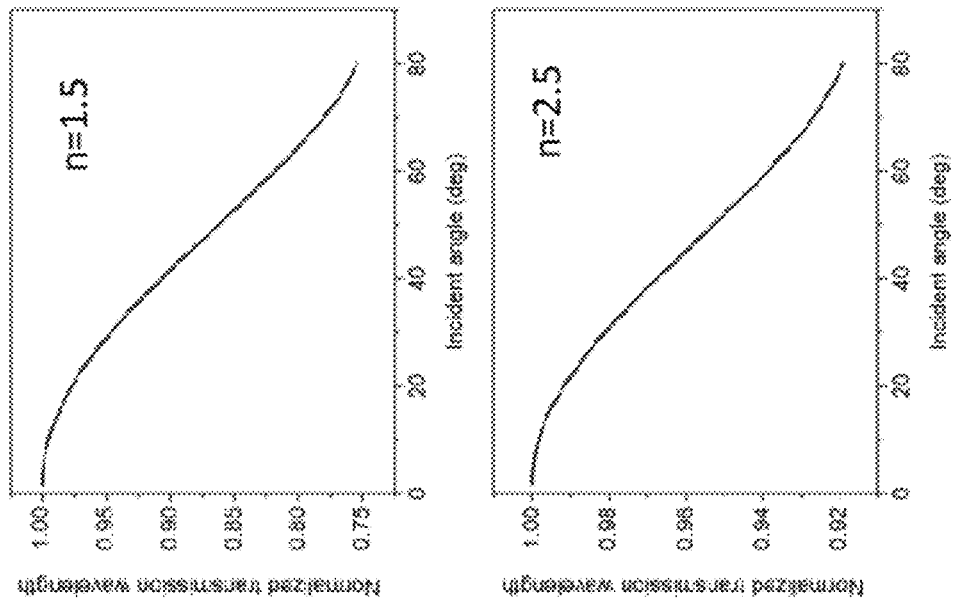
Figures 4C, 4D:
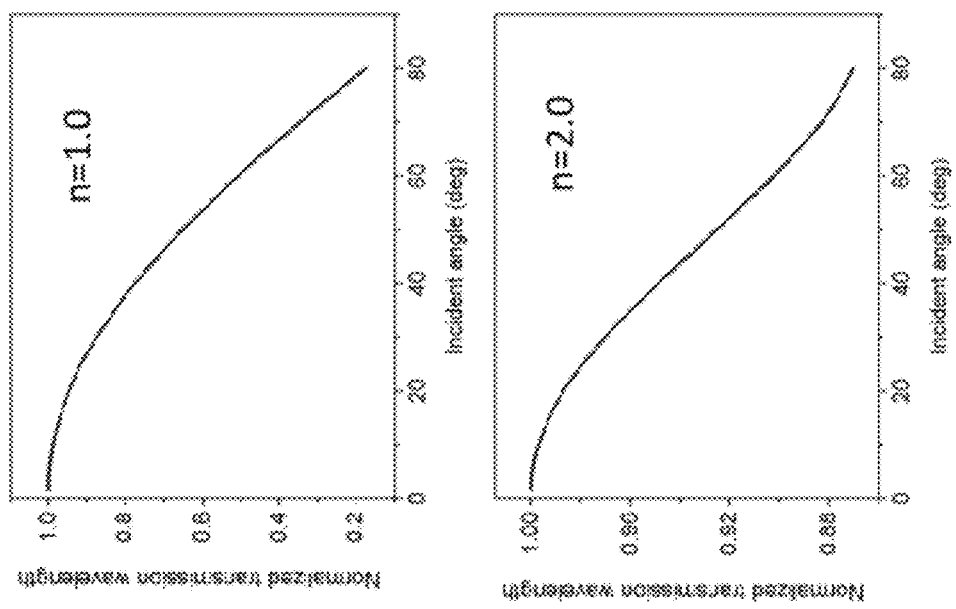
Figure 8A:
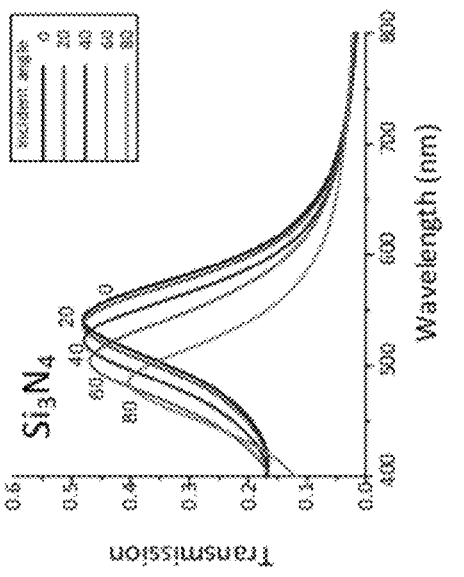
Figure 8B:
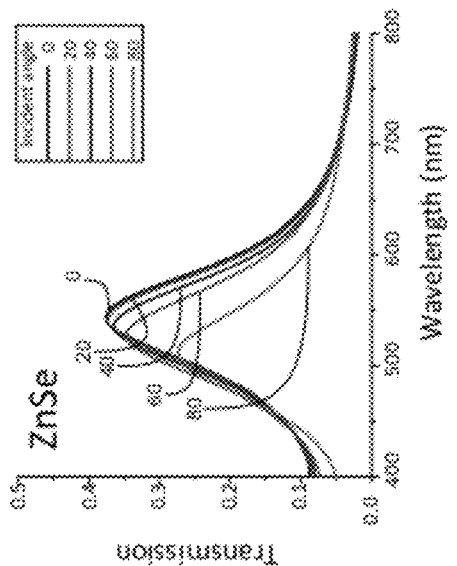
Figure 8C:
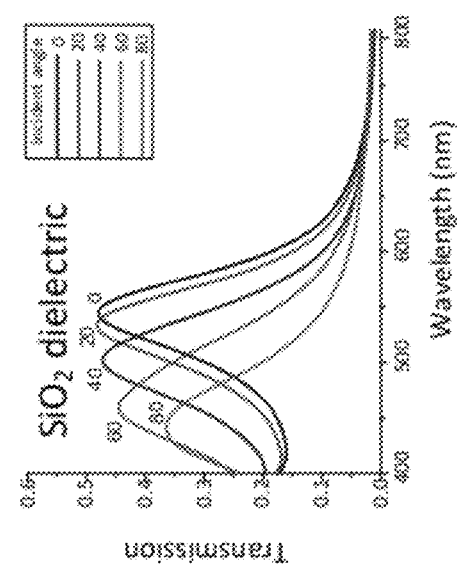
Figure 9:
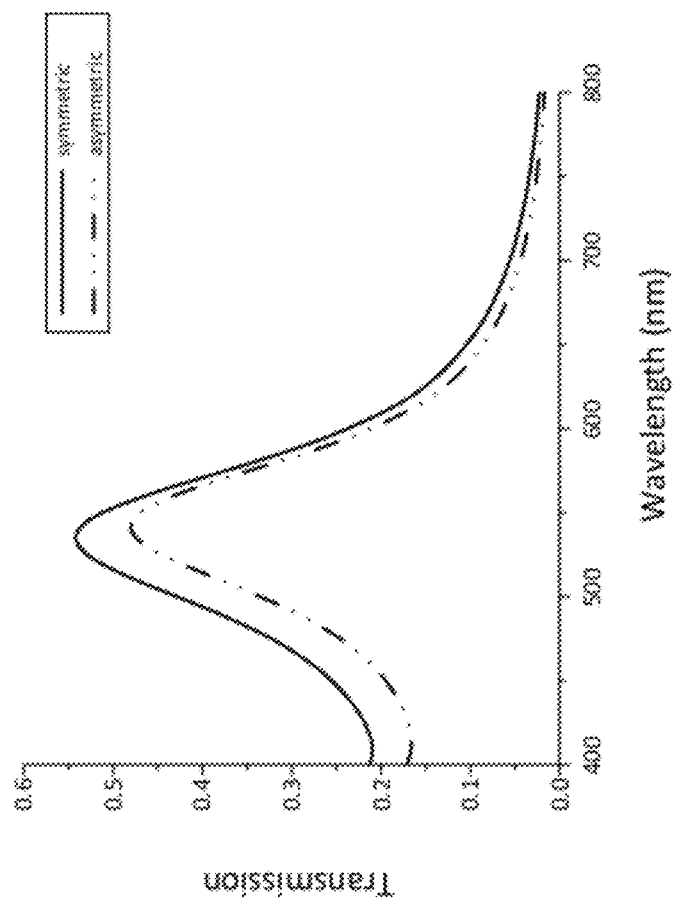
Figure 11B:
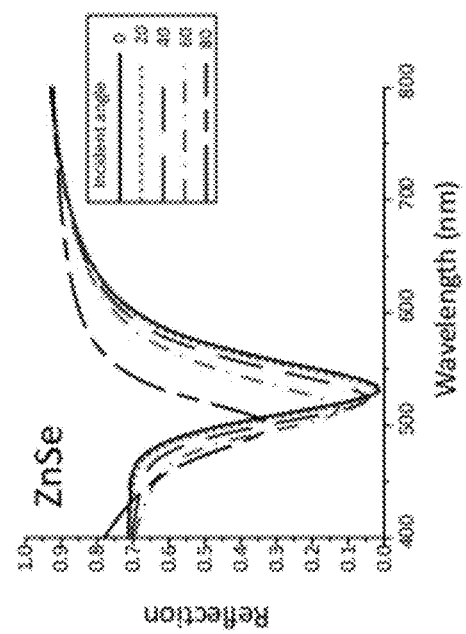
Figure 11C:
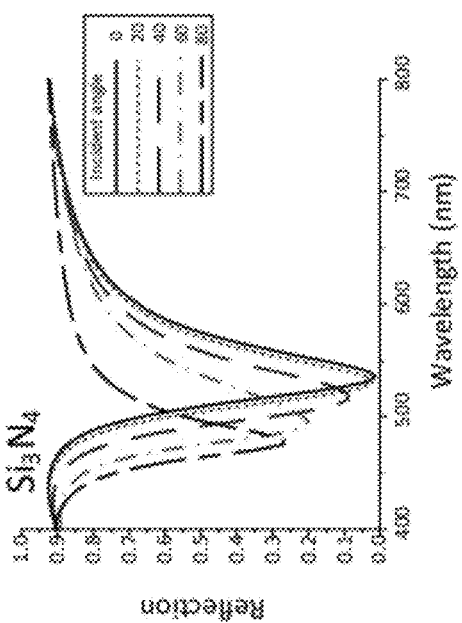
Figure 11A:
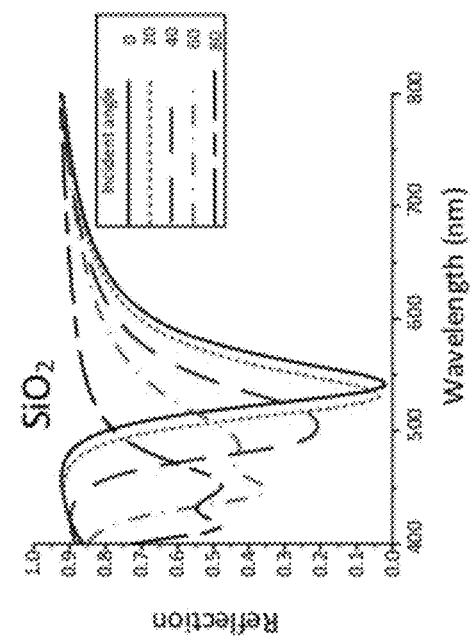
Figure 12A:
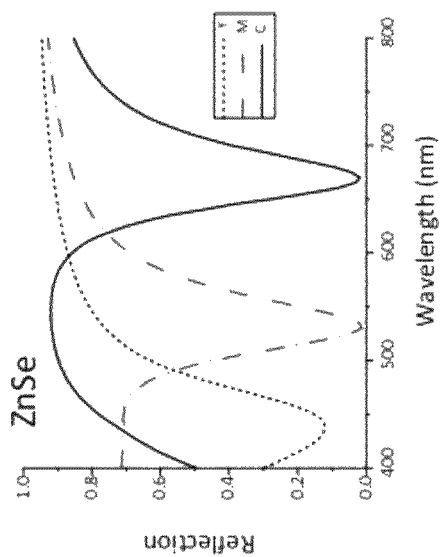
Figure 12B:
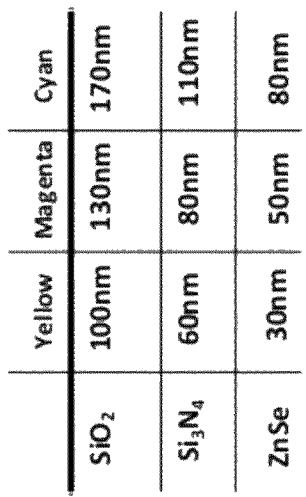
Figure 12C:
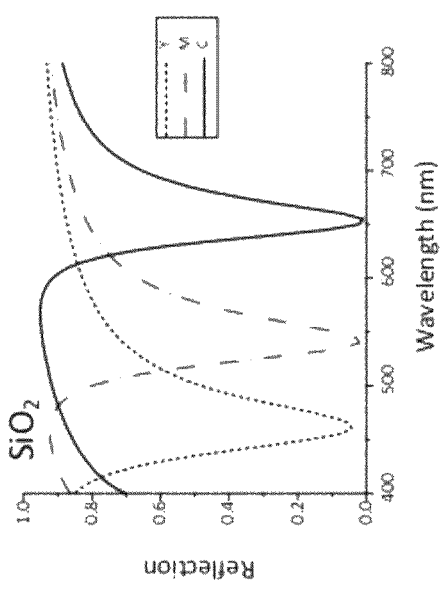
Figure 12D:
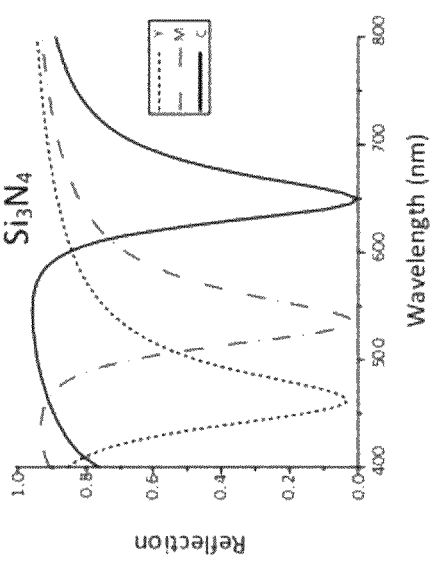
Figure 14A:
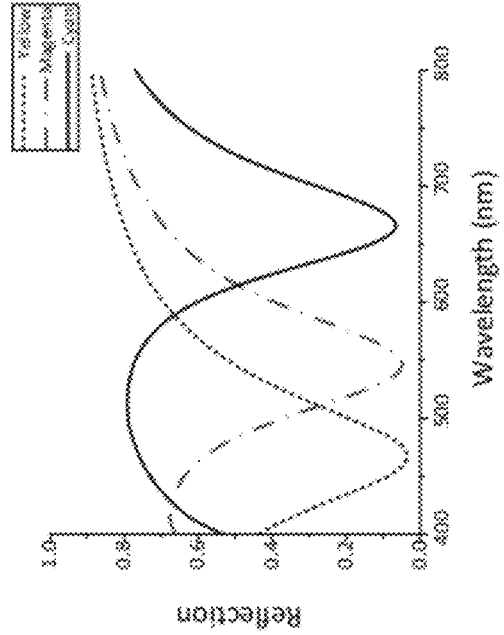
Figure 14B:
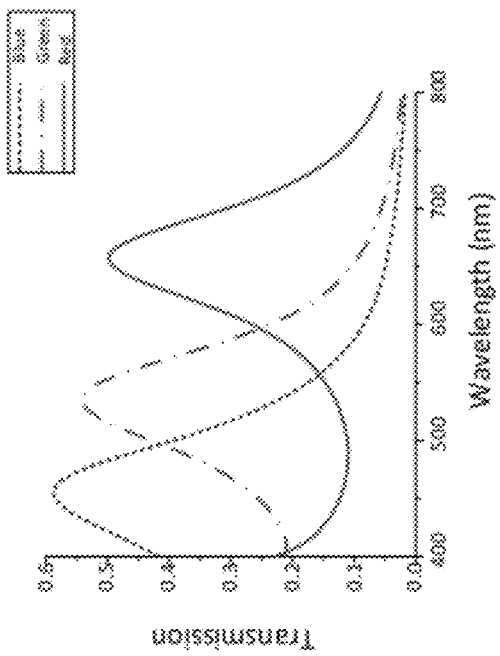
Figure 16:
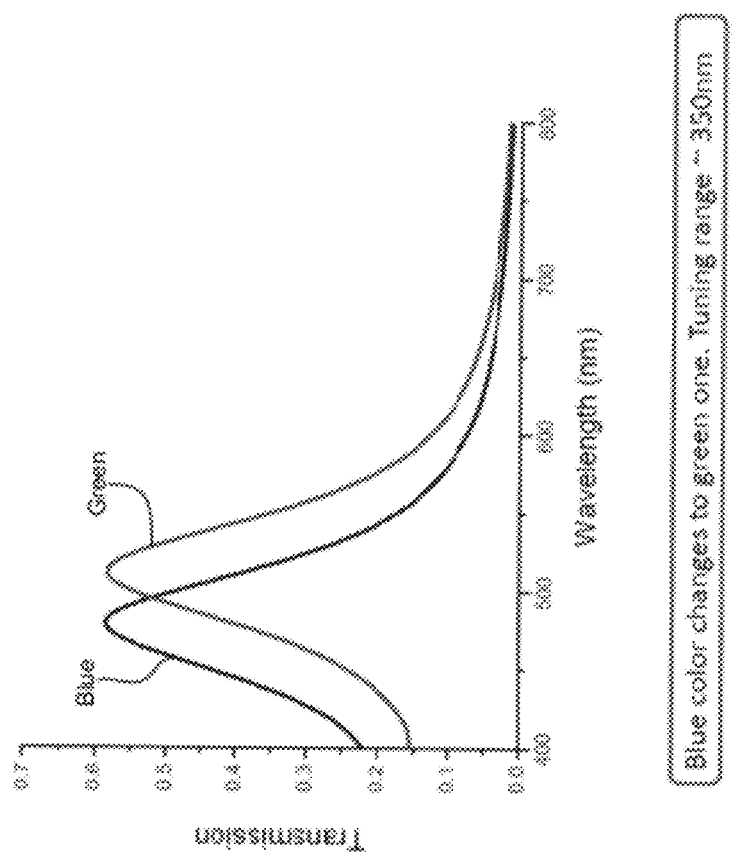
Figure 17:
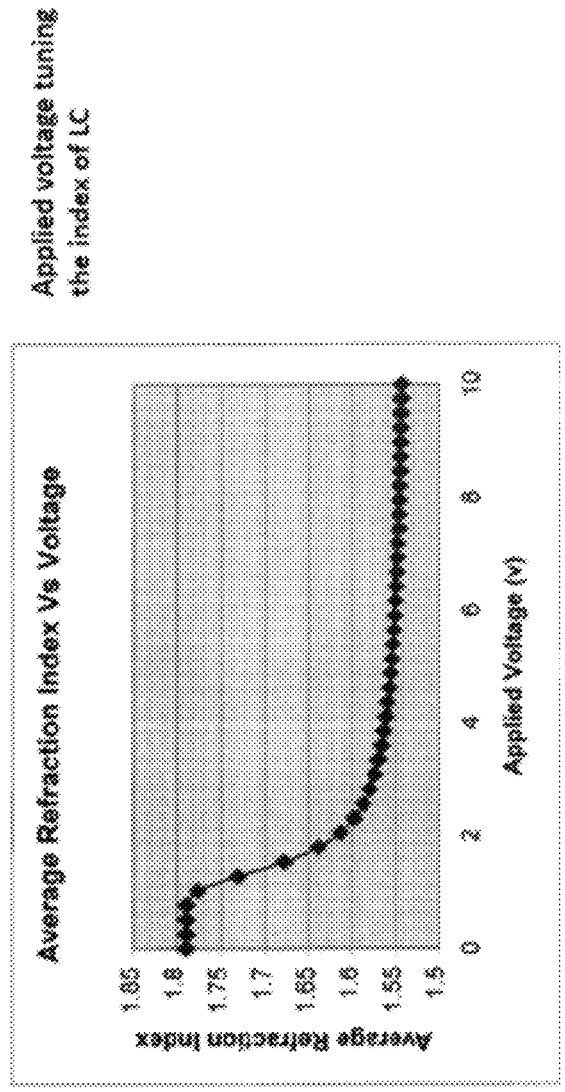
Figure 18:
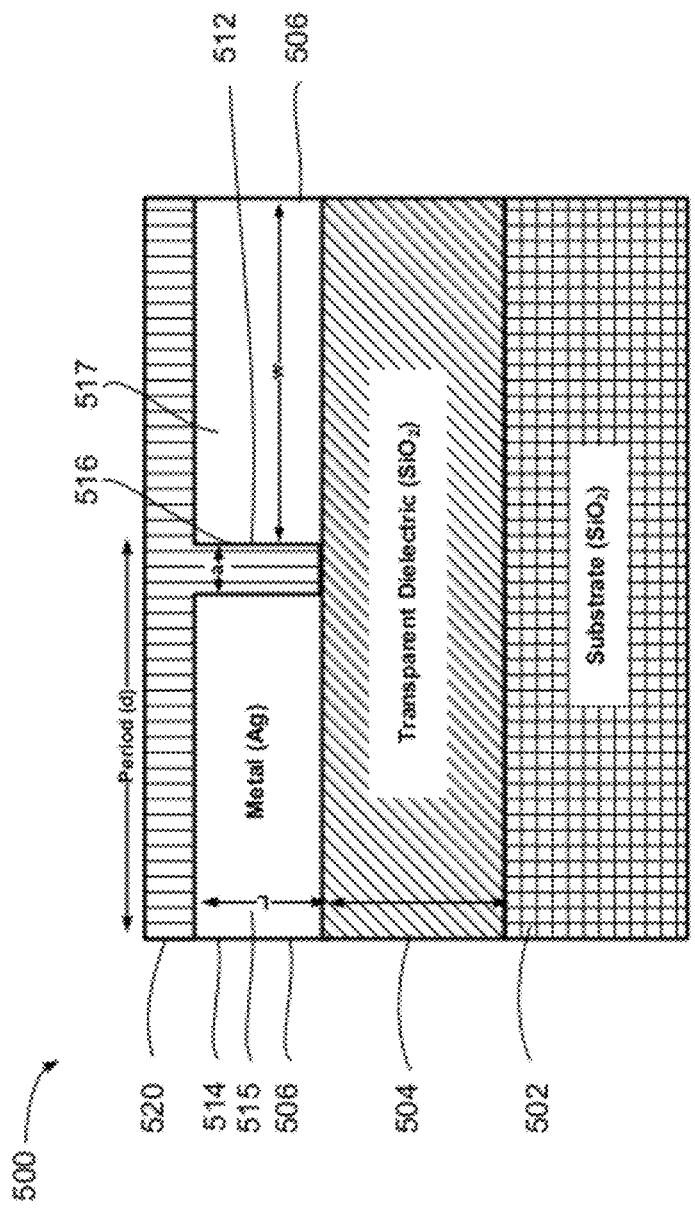
Figure 19A:
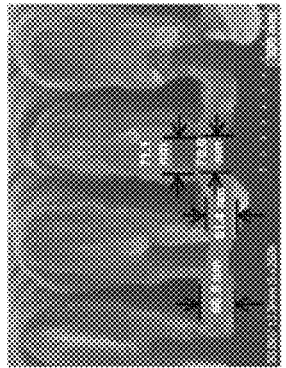
Figure 19B:
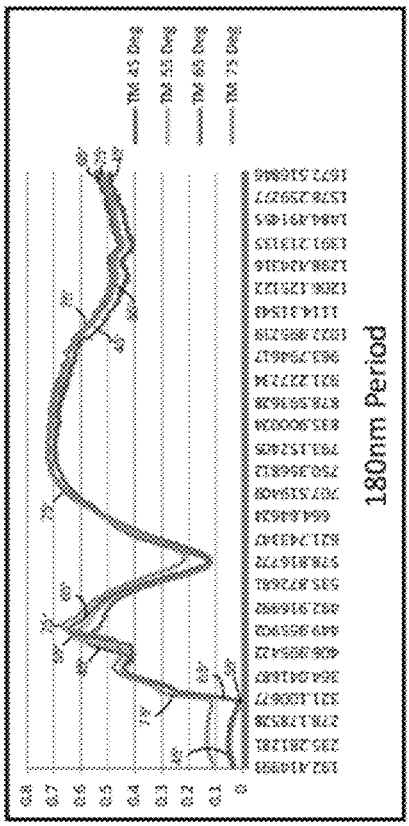
Figure 20A:
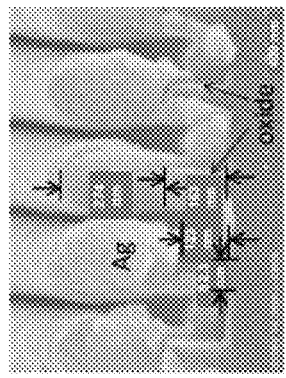
Figure 20B:
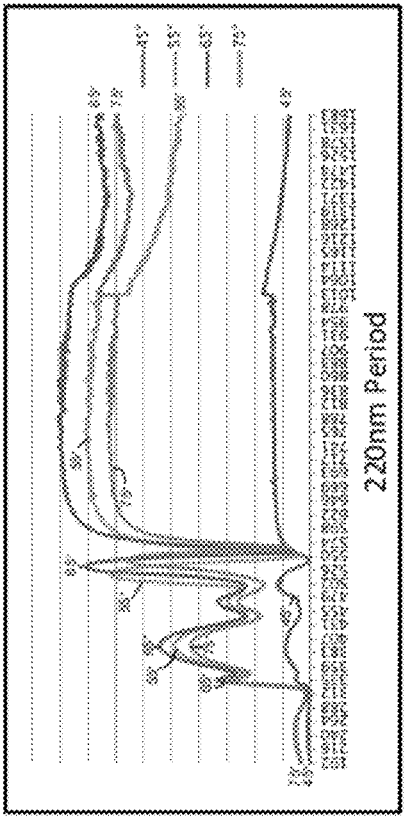
Figure 22:
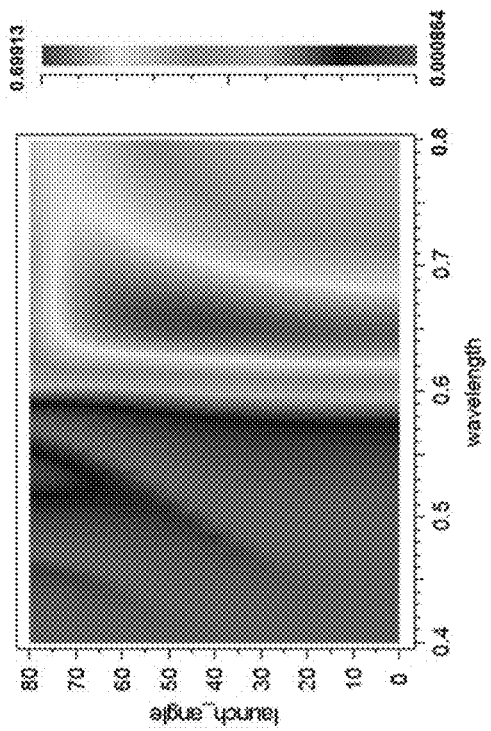
Figure 21:
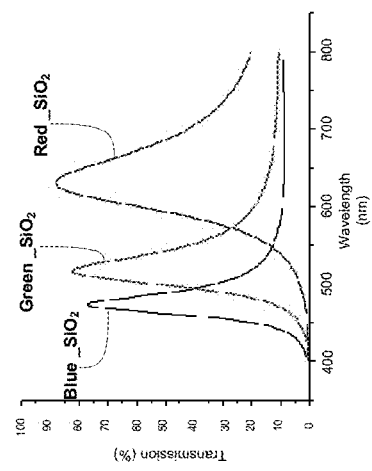

FIGS. 4A-4D are graphs showing the dependence of filtered wavelength shift on the incident angle (Θ) and dielectric index (n) in Fabry-Perot based filters, where FIG. 4A has a dielectric material with a refractive index of 1.0, FIG. 4B has a dielectric material with a refractive index of 1.5, FIG. 4C has a dielectric material with a refractive index of 2.0; and FIG. 4D has a dielectric material with a refractive index of 2.5;

FIG. 5 shows a sectional view of an exemplary optical filter assembly prepared in accordance with certain aspects of the present teachings having a symmetric layer architecture;

FIGS. 6A-6B show simulations comparing wavelength versus transmission for both a low refractive index dielectric material ($SiO_2$) (FIG. 6B) and a high refractive index dielectric material ($Si_3N_4$) (FIG. 6A);

FIGS. 7A-7B show sectional views of exemplary optical transmission filter assemblies prepared in accordance with certain aspects of the present teachings, where FIG. 7A has an asymmetric layer architecture and FIG. 7B has a symmetric layer architecture;

FIGS. 8A-8C are graphs show simulations comparing wavelength versus transmission for transmission type optical filter assemblies to demonstrate the angle dependence of a filtered green light output. FIG. 8A has a low refractive index dielectric material ($SiO_2$) at a thickness of about 130 nm to provide a filtered green light output; FIG. 8B has a dielectric material comprising zinc selenide (ZnSe) with a refractive index of about 2.5 at a thickness of about 50 nm to provide green light; and FIG. 8C includes a high refractive index dielectric material ($Si_3N_4$) at a thickness of about 80 nm to provide a green light;

FIG. 9 shows a comparison of wavelength versus transmission for two transmission type filters where a first filter has a symmetric layer architecture and the second filter has an asymmetric layer architecture;

FIGS. 10A-10D compare exemplary red-green-blue transmission filters, where FIGS. 10A-10C compare wavelength versus transmission for transmission type optical filter assemblies. FIG. 10D shows respective thicknesses for each dielectric material in the filter assembly to achieve blue, green, and red light filtering. FIG. 10A shows red, green, and blue filtering for a low refractive index dielectric material ($SiO_2$). FIG. 10B shows red, green, and blue filtering for a ZnSe dielectric material while FIG. 10C shows red, green, and blue light filtering where the dielectric material is a high refractive index material ($Si_3N_4$);

FIGS. 11A-11C are graphs showing simulations comparing wavelength versus reflection for a reflection-type optical filter assemblies to demonstrate the angle dependence of a filtered magenta light output. FIG. 11A has a low refractive index dielectric material ($SiO_2$) at a thickness of about 130 nm to provide a filtered magenta light output (with incident angles ranging from 0 to 80°). FIG. 11B has a dielectric material with a high refractive index comprising ZnSe (refractive index, n=2.5) at a thickness of about 50 nm to provide a filtered magenta light output (with incident angles ranging from 0 to 80°). FIG. 11C includes a high refractive index dielectric material ($Si_3N_4$) (refractive index, n=2.0) at a thickness of about 80 nm to provide a filtered magenta light output (with incident angles ranging from 0 to 80°);

FIGS. 12A-12D compare exemplary yellow-magenta-cyan reflection filters having asymmetric layer architecture, where FIGS. 12A-12C compare wavelength versus reflection for reflection type optical filter assemblies (where both reflective layers comprise silver). FIG. 12D shows respective thicknesses for each dielectric material in the filter assembly to achieve yellow, magenta, and cyan light filtering. FIG. 12A shows yellow, magenta, and cyan filtering for a low refractive index dielectric material ($SiO_2$). FIG. 12B shows yellow, magenta, and cyan filtering for a high index ZnSe dielectric material, while FIG. 12C shows yellow, magenta, and cyan light filtering where the dielectric material is a high refractive index material ($Si_3N_4$);

FIGS. 13A-13D compare exemplary yellow-magenta-cyan reflection filters having asymmetric layer architecture, where FIGS. 13A-13C compare wavelength versus reflection for reflection type optical filter assemblies (where a first reflective layer comprises silver and a second reflective layer comprises aluminum). FIG. 13D shows respective thicknesses for each dielectric material in the filter assembly to achieve yellow, magenta, and cyan light filtering. FIG. 13A shows yellow, magenta, and cyan filtering for a low refractive index dielectric material ($SiO_2$). FIG. 13B shows yellow, magenta, and cyan filtering for a high refractive index dielectric material ZnSe, while FIG. 13C shows yellow, magenta, and cyan light filtering where the dielectric material is a high refractive index material ($Si_3N_4$);

FIGS. 14A-14B show a transmission and reflection filter assembly in accordance with certain aspects of the present disclosure having an asymmetric layer architecture, where the dielectric material is a high refractive index material ($Si_3N_4$) and the reflective layers comprise silver. FIG. 14A shows red-blue-green transmissive filtering and FIG. 14B shows yellow-magenta-cyan reflective filtering;

FIG. 15 shows a process for fabricating a filter assembly with different color pixels for a visual display in accordance with certain aspects of the present teachings;

FIG. 16 shows wavelength versus transmission for a transmission-type tunable Fabry-Perot-based spectrum filter comprising a liquid crystal dielectric prepared in accordance with certain aspects of the present teachings;

FIG. 17 shows a liquid crystal refractive index versus applied voltage for use as a dielectric material in a tunable Fabry-Perot-based spectrum filter according to certain aspects of the present teachings;

FIG. 18 shows a sectional view of an exemplary optical filter assembly having minimal angle dependence prepared in accordance with certain alternative embodiments of the present teachings having a high refractive index grating structure with an embedded dielectric material in the grating openings;

FIGS. 19A-19B show a reflection color optical filter having relatively minimal angle independence prepared in accordance with certain variations of the present teachings. FIG. 19A shows an scanning electron microscope (SEM) image of an exemplary high refractive index conductive mesh grating nano-structure fabricated from silver on a substrate having slit openings features with a period of 220 nm (scale bar is 400 nm). FIG. 19B shows a plot of wavelength versus reflection of transverse magnetic (TM) polarized light at distinct incident angles of 45°, 55°, 65°, and 75°;

FIGS. 20A-20B show another reflection color optical filter having minimal angle independence prepared in accordance with certain variations of the present teachings. FIG. 20A shows an scanning electron microscope (SEM) image of an exemplary high refractive index conductive mesh grating nano-structure fabricated from silver on a substrate having slit openings features with a period of 180 nm (scale bar is 300 nm). FIG. 20B shows a plot of wavelength versus reflection of transverse magnetic (TM) polarized light at distinct incident angles of 45°, 55°, 65°, and 75°;

FIG. 21 shows simulations comparing wavelength versus transmission for an optical filter assembly having minimal angle dependence with an architecture similar to that shown in FIG. 19;

FIG. 22 is a calculated map of the reflection for an optical filter assembly like that in FIG. 21 having angle-independent color filtration, designed to be a red color filter that exhibits strong angle tolerance up to at least about 60 degrees of incident angle (showing a relatively small shift when incident angles are changed);

FIG. 23 shows a schematic of a design principle for a conductive grating structure of an optical filter assembly, where the conductive grating structure is subwavelength, exhibits a large effective refractive index, and is capable of transmitting transverse magnetic (TM) polarized light, while reflecting transverse electric (TE) polarized light waves.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters.

In addition, disclosure of ranges includes disclosure of all values and further divided ranges within the entire range, including endpoints given for the ranges. Example embodiments will now be described more fully with reference to the accompanying drawings.

Disclosed is a new structure that produces spectrum filtering, such as color filtering, based on optical interference effect, rather than optical absorption by colorant materials. In certain aspects, the present teachings provide an optical spectrum filtering device comprising an interference filter assembly that generates a filtered electromagnetic energy output having minimal angle dependence. By way of non-limiting example, such interference filter devices can be Fabry-Perot etalon devices that filter light, while further having a high refractive index dielectric layer to minimize angle dependence of the filtered light in accordance with the present teachings.

Both transmission and reflection color filtering can be achieved by filter devices prepared in accordance with the present teachings. Thus, in certain variations, the optical spectrum filtering device may be a transmission-type filter, while in other variations; the optical spectrum filtering device may be a reflection-type filter. In yet other variations, the optical spectrum filtering device concurrently exhibits both a transmission and reflection-type filter.

The interference filter assembly comprises a dielectric material. In certain variations, such a dielectric material has a relatively high refractive index, for example, greater than about 1.4. In certain aspects, a dielectric material has a relatively high refractive index preferably greater than about 1.5, optionally greater than or equal to 2, optionally greater than or equal to about 3, and in certain variations, greater than or equal to about 4. In certain variations, the interference filter assembly also comprises a pair of parallel reflective surfaces, where each reflective surface comprises a metal. The dielectric material is disposed between the pair of parallel reflective surfaces.

In certain aspects, the filter assembly is capable of transmitting a portion of an electromagnetic spectrum into the dielectric material to generate a filtered output having a predetermined range of wavelengths that exits the filter assembly. Any non-transmitted light is mainly (with a very small portion of light absorbed by metal) reflected and therefore can be recycled. The filtered output desirably displays minimal angle dependence, making it particularly advantageous for use as pixels in display devices, by way of non-limiting example. The spectrum or color filter can be made to be polarization independent. Such an optical spectrum filtering device filter is more energy efficient than traditional colorant based filters and furthermore can withstand high input optical power.

With reference to FIGS. 1 and 2, one embodiment of an optical spectrum filtering device 20 includes a filter assembly 30. The filter assembly 30 defines a first side 32 and a second opposite side 34. The filter assembly 30 includes a first transmissive substrate or layer 40, a first reflective surface 42 disposed adjacent to the transmissive layer 40. The filter assembly 30 also includes at least one dielectric material layer 44 adjacent to the first reflective surface 42. A second reflective surface 46 is disposed adjacent to dielectric material layer 44 on a side opposite to the first reflective surface 42. Together, the first reflective surface 42 and the second reflective surface 46 form a pair of parallel reflective surfaces that sandwich the dielectric material layer 44. As shown in FIGS. 1 and 2, an optional second transmissive layer 48 is disposed adjacent to the second reflective surface 46. The optical second transmissive layer 48 can be a cladding for example. Such a filter assembly 30 has a "symmetric architecture," where the first transmissive layer 40 has a matching second transmissive layer 48 on the other side 34 of the pair of parallel reflective surfaces 42, 46 flanking the dielectric material layer 44. While not shown in FIG. 1, if the second transmissive layer 48 was omitted, the filter assembly 30 would have an asymmetric architecture, because the second reflective surface 46 would interface with air 56 or another external medium instead of second transmissive layer 48 (and therefore, the assembly architecture would be asymmetric).

In FIG. 1, the second transmissive layer 48 defines a visible surface 50. A source 52 of electromagnetic radiation is directed towards the filter assembly 30 of optical spectrum filtering device 20 along the first side 32. The filter assembly 30 is capable of transmitting a portion of a spectrum of electromagnetic radiation from source 52 into the assembly 30. Thus, a portion of electromagnetic radiation enters through the first transmissive layer 40 and through the first reflective layer 42 to enter into the dielectric material layer 44. The path of the electromagnetic radiation inside the interference filter depends upon whether the optical spectrum filtering device 20 is designed to be a transmission-type filter, a reflection-type filter, or a transmission and reflection-type filter. As shown in the transmission-type Fabry-Perot based filter of FIG. 1, the portion of electromagnetic energy that enters the dielectric material 44 resonates between the pair of parallel reflective surfaces (like a Fabry-Perot based etalon interference filter). A portion of the electromagnetic energy is transmitted through the second reflective surface 46 and second transmissive layer 48 generating a filtered output 60 having a predetermined range of wavelengths that exits the filter assembly 30.

By way of background, the general operational principles of a Fabry-Perot based filter are shown in FIG. 3 and will be discussed herein. An electromagnetic wave 100 approaches first reflective surface 102 at an incident angle $\Theta_1$. A dielectric material 104 is disposed adjacent to the first reflective surface 102. A substantially parallel second reflective surface 106 is disposed on an opposite side of the dielectric material 104. The thickness of the dielectric material 104 (also the distance between the first and second parallel reflective surfaces 102, 106) is represented by d and the refractive index of the dielectric material by n. Notably, for interference filters, such as Fabry-Perot based etalons, d is less than a target wavelength to be filtered in the structure, so that d is sub-wavelength. Each portion of electromagnetic wave 100 that is reflected is designated $R_n$, where n is an integer, and each transmitted portion of electromagnetic wave 100 is designated $T_n$, where n is an integer. A phase difference between each succeeding transmitted beam (e.g., $T_1$, $T_2$, etc. . . . ) is:

$$\delta = 2kd\cos(\theta_2) = 2\frac{2\pi n}{\lambda}d\cos(\theta_2)$$

A transmission maximum occurs at $\delta=2m\pi$ so that 2nd $\cos(\theta_2)=m\lambda$, where $\lambda$ is the wavelength. $\Theta_2$ can be determined by the Snell's law: $\sin(\theta_1)=n\sin(\Theta_2)$. $\Theta_1$ is the incident angle in the external medium (e.g., air). The wavelength shift of the filtered output depends on the incident angle ($\Theta_1$) and dielectric index (n). The results are calculated by the analytic equations above and thickness of metal in the first and second reflective layers are not included in the calculations.

In various aspects, the present disclosure provides a filter having reduced angle dependence, meaning that as the viewing angle deviates from normal (0°) to parallel to the visible surface (nearing 90°), the wavelength of the filtered light is not considerably shifted. As noted above, angle dependency is a frequent problematic issue with conventional color filters used in display devices, even in conventional Fabry-Perot (F-P) based filters. However, the shift of the transmission wavelength for increasing incident angle ($\Theta_1$) is reduced by using a high refractive index dielectric medium in the assemblies prepared in accordance with the present teachings. This is because there is a transition for the $\Theta_1$ to $\Theta_2$ according to Snell's law, and a large refractive index interlayer of F-P resonator drastically decreases the angle $\Theta_2$. Therefore, in accordance with the principles of the inventive technology, by including specific dielectric materials having desirably high refractive indices, the angle dependency of the filter device can be significantly reduced/minimized. The high refractive index materials described herein may include traditional dielectric materials, but may also include optical metamaterials, liquid crystals, and other high index materials described below. This principle applies to both transmission and reflection spectrum filters, like color filters.

Thus, in various aspects, an optical spectrum filtering device comprises an interference filter assembly comprising a dielectric material having a refractive index of greater than about 1.5 disposed between a pair of parallel reflective surfaces. In certain variations, each reflective surface comprises a reflective material, such as a metal like silver or aluminum, by way of non-limiting example. The filter assembly is capable of transmitting a portion of an electromagnetic spectrum into the dielectric material to generate a filtered output having a predetermined range of wavelengths that exits the filter assembly, wherein the filtered output has a predetermined range of wavelengths and displays minimal angle dependence.

Particularly suitable visible and infrared electromagnetic radiation includes, visible light having wavelengths ranging from about 390 to about 750 nm and infrared radiation (IR) (including near infrared (NIR) ranging from about 0.75 to about 1.4 µm). Filtered electromagnetic radiation can have a wavelength in a range of about 625 nm to 740 nm for red; orange is at about 590 nm to about 625 nm; yellow is at about 565 nm to about 590 nm; green is at about 520 nm to about 565 nm; blue or cyan is at about 500 nm to about 520 nm; blue or indigo is at about 435 nm to about 500 nm; and violet is at about 380 nm to about 435 nm. Further, in certain aspects, the filtered light may be extra-spectral or a mixture of several different wavelengths. For example, magenta is an extra-spectral mixture of red (625 nm to 740 nm) and blue (435 nm to 500 nm) wavelengths.

In certain aspects, the optical spectrum filtering device is a transmission-type filter. In such a case, the filter assembly is capable of transmitting a portion of the electromagnetic spectrum through a first surface of the pair of parallel reflective surfaces into the dielectric material. The transmitted portion of the electromagnetic spectrum is thus transmitted to the other second surface of the pair of parallel reflective surfaces, where it is transmitted there through. Thus, the portion of the electromagnetic spectrum (e.g., 52 of FIGS. 1 and 2) enters on a first side (side 32 of FIGS. 1 and 2) of the filter assembly 30 and the filtered output 60 exits on a second side (side 34 of FIGS. 1 and 2) opposite to the first side (32).

In certain variations, the optical spectrum filtering device transmission-type filter generates a filtered output that exits the filter assembly having a predetermined range of wavelengths in the visible light range. Such a predetermined range of wavelengths may include a color selected from the group consisting of: red, green, blue, and combinations thereof.

In other aspects, the optical spectrum filtering device is a reflection-type filter, so that the filter assembly is capable of transmitting the portion of the electromagnetic spectrum through one of the pair of parallel reflective surfaces into the dielectric material to the other of the pair of parallel reflective surfaces. However, a portion of the electromagnetic spectrum that enters on a first side of the filter assembly is reflected within the assembly so that the filtered output exits on the same first side of the filter assembly where it entered.

In certain variations, the optical spectrum filtering device is a reflection-type filter that generates a filtered output that exits the filter assembly having a predetermined range of wavelengths in the visible light range. Such a predetermined range of wavelengths may include a color selected from the group consisting of: cyan, magenta, yellow, and combinations thereof.

In certain other variations, the optical spectrum filtering device may concurrently be both a transmission-type filter and a reflection-type filter, so that both a transmitted portion of light and a reflected portion of light are generated after the electromagnetic spectrum enters the filter assembly. Thus, in certain embodiments, the transmitted predetermined range of wavelengths generated by the optical spectrum filtering device is in the visible light range and may include a color selected from the group consisting of: red, green, blue, and combinations thereof while the reflected predetermined range of wavelengths may include a color selected from the group consisting of: cyan, magenta, yellow, and combinations thereof, as well.

FIGS. 4A-4D demonstrate the diminished angle dependence of filtered output in accordance with the inventive principles, showing dependence of filtered wavelength shift on the incident angle ($\Theta$) and dielectric index (n) in a Fabry-Perot based filters. In FIG. 4A, a dielectric material in the filter assembly has a refractive index of 1.0 and shows a marked undesirable shift in wavelength (normalized values ranging from about 1.0 at an incident angle of just greater than 0° to less than 0.2 as the incident angle increases to 80°). FIG. 4B has a dielectric material with a refractive index of 1.5 in the filter assembly and shows significant improvement in the filtered wavelength shift, where normalized values ranging from about 1.0 at an incident angle of just greater than 0° to less than 0.75 as the incident angle increases to 80°). FIG. 4C has a dielectric material in the filter assembly with a refractive index of 2.0 and shows yet more improvement in diminishing wavelength shift, where normalized wavelength ranges from about 1.0 at an incident angle of just greater than 0° to less than 0.88 as the incident angle increases to 80°. FIG. 4D has a dielectric material in the filter assembly with a refractive index of 2.5 and shows the best improvement in diminishing wavelength shift of filtered light, where normalized wavelengths range from about 1.0 at an incident angle of just greater than 0° to less than 0.92 as the incident angle increases to 80°. Hence, the higher the refractive index of the dielectric material in the filter assembly structures, the greater the minimization of angle dependence of the filtered output generated.

FIG. 5 shows a sectional view of an exemplary optical filter assembly having a symmetric layer architecture according to certain aspects of the present teachings. A first transmissive layer 200 is adjacent to a first reflective layer 202 that comprises a reflective material. A second reflective layer 212 is substantially parallel to the first reflective layer 202 and likewise comprises a reflective material (which may be the same as or distinct from the reflective material(s) in the first reflective layer 202). Thus, the first and second reflective layers 202, 212 form a pair of parallel reflective substrates or layers that flank a dielectric material 210.

In one embodiment, the first transmissive layer 200 can be a glass substrate (comprising silicon dioxide—$SiO_2$). The first reflective layer 202 optionally comprises silver and has a thickness of about 20 nm. The second reflective layer 212 likewise comprises silver and has a thickness of about 20 nm. In one embodiment according to certain aspects of the present teachings, the dielectric material 210 optionally comprises a high refractive index material, such as silicon nitride ($Si_3N_4$, with a refractive index is about 2), which optionally has a thickness of about 100 nm. Two reflective layers 202 and 212 comprising silver with a 20 nm thickness can surround the dielectric material 210, adjacent to a glass substrate 200 and a silica cladding 220 having a thickness of about 100 nm. In another embodiment according to certain aspects of the present teachings, the dielectric material 210 optionally comprises a high refractive index material, such as silicon nitride ($Si_3N_4$, where refractive index is about 2), which optionally has a thickness of about 40 nm and has two reflective layers 202 and 212 comprising silver with a 20 nm thickness, a glass substrate 200 and a silica cladding 220 having a thickness of about 100 nm. In a first comparative example, the reflective layers, substrate, and cladding may be the same as those embodiments described above, but the dielectric material 210 may be a relatively low refractive index material comprising silica (silicon dioxide, $SiO_2$, where a refractive index is 1.5) at a thickness of about 150 nm. In a second comparative example, the reflective layers, substrate, and cladding may be the same as those embodiments described above, but the dielectric material 210 again may be a relatively low refractive index material comprising silica (silicon dioxide, $SiO_2$, where a refractive index is 1.5) at a thickness of about 120 nm.

Comparative simulation results of wavelength versus transmission are shown in FIGS. 6A-6B for structures similar to those in FIG. 5. A first comparative filtering assembly comprises a relatively low refractive index dielectric material (n=1.5) comprising silica ($SiO_2$) at a thickness of about 120 nm with results shown in FIG. 6B and a second assembly prepared in accordance with certain aspects of the present disclosure comprises a high refractive index dielectric material layer comprising silicon nitride ($Si_3N_4$) as a high refractive index (n=2.0) dielectric material shown in FIG. 6A. The dielectric layer comprising $Si_3N_4$ dielectric has a thickness of about 40 nm.

As can be seen in FIG. 6B, with a low refractive index silica dielectric material for the optical filter assembly, as the incident angle increases from 0 to 60, the wavelength undesirably shifts approximately 120 nm. In FIG. 6A, which reflects an optical filter assembly according to certain aspects of the present teachings, a minimal wavelength shift occurs of less than approximately 40 nm when the incident angle increases from 0 to 60, thus demonstrating that the inventive technology significantly diminishes angle dependence for optical spectrum filtering devices.

FIGS. 7A-7B show exemplary optical transmission filter assemblies prepared in accordance with certain aspects of the present teachings, showing a comparative asymmetric layer architecture for an interference filter assembly in FIG. 7A and a symmetric layer architecture for an interference filter assembly in FIG. 7B. FIG. 7A shows a transmission-type optical filter assembly comprising a first transmissive layer 300, which optionally comprises a material transmissive to the electromagnetic wavelengths entering the optical filtering device, such as a glass substrate (comprising silicon dioxide—$SiO_2$). A first reflective layer 302 comprises a first reflective material, such as silver. Such a first reflective layer 302 may have a thickness of about 20 nm, by way of non-limiting example. A second reflective layer 312 is substantially parallel to the first reflective layer 302 and together the first and second reflective layers 302, 312 form a pair of parallel reflective substrates that flank a dielectric material 310. The second reflective layer 312 comprises a second reflective material, such as silver, and has a thickness of about 20 nm by way of non-limiting example. A dielectric layer 310 may optionally comprise silicon nitride ($Si_3N_4$) at a thickness of about 100 nm by way of non-limiting example. Notably, the second reflective layer 312 has a visible surface 314 that interfaces with a surrounding atmosphere 316, such as air. Thus, the transmissive filter assembly in FIG. 7A has an asymmetric layer architecture, which includes interfaces between the following materials: air (external environment or atmosphere 316), 20 nm Ag layer (second reflective layer 312), dielectric layer (310), 20 nm Ag layer (first reflective layer 302), and glass substrate (first transmissive layer/substrate 300).

FIG. 7B includes the same transmission filter assembly components described above for the embodiment of FIG. 7A, but further includes a transmissive cladding layer 320 disposed over second reflective layer 312. The transmissive cladding layer 320 comprises a material that is substantially transmissive to the wavelengths entering the optical filtering device, such as glass (silicon dioxide, $SiO_2$). Thus, the second transmissive cladding layer 320 matches the first transmissive layer 300 to form a symmetric architecture. Thus, in FIG. 7B, the optical filter assembly has a symmetric layer architecture, which includes interfaces between the following materials: air (external environment or atmosphere 316), the second transmissive glass top cladding layer (320), the 20 nm Ag layer (second reflective layer 312), dielectric layer (310), 20 nm Ag layer (first reflective layer 302), and glass substrate (first transmissive layer/substrate 300).

FIGS. 8A-8C are graphs showing simulations comparing wavelength versus transmission for transmission-type symmetric optical filter assemblies to demonstrate the angle dependence of a filtered green light output. FIG. 8A has a low refractive index (n=1) dielectric material ($SiO_2$) at a thickness of about 130 nm to provide a filtered green light output at 0° incident angle. FIG. 8B has a high refractive index material (n=2.5) ZnSe at a thickness of about 50 nm to provide filtered green light at 0° incident angle. Lastly, FIG. 8C includes a high refractive index (n=2.0) dielectric material ($Si_3N_4$) at a thickness of about 80 nm to provide a filtered green light at 0° incident angle. As can be seen, the lowest refractive index dielectric material (silicon dioxide in FIG. 8A) exhibits the greatest wavelength shift of all three dielectric materials when the incident angle increases from 0 to 80°, where the wavelength shift is about 100 nm. The high refractive index dielectric material ($Si_3N_4$) in FIG. 8C has a wavelength shift of about 50 nm as the incident angle increases from 0 to 80°, while the highest refractive index dielectric material (ZnSe) in FIG. 8B desirably has a wavelength shift of only about 30 nm as the incident angle increases from 0 to 80°.

FIG. 9 shows a comparison of wavelength versus transmission for two transmission type optical filters. The first filter has a symmetric layer architecture and the second filter has an asymmetric layer architecture. As can be seen, the symmetry of the filter assembly in the symmetric architecture (like the filter assembly shown in FIG. 7B) increases the magnitude of transmission of the filtered electromagnetic radiation, as compared to the asymmetrical filter assembly (like FIG. 7A). However, both symmetric and asymmetric filter assemblies exhibit reduced angle dependence as optical filters and thus both are contemplated as variations of the present teachings.

FIGS. 10A-10D show results of comparative multi-colored (red-green-blue) transmission interference filters made in accordance with certain variations of the present disclosure. FIGS. 10A-10C compare wavelength versus transmission for transmission-type optical filter assemblies. FIG. 10D shows respective thicknesses for each dielectric material in the filter assembly to achieve blue, green, and red light filtering in the transmissive filter. For example, a comparative optical filter comprises a relatively low index dielectric material comprising silicon dioxide ($SiO_2$) has a thickness of about 100 nm for generating a blue colored filtered output, a thickness of about 130 nm for generating a green colored filtered output, and a thickness of about 170 nm for generating a red colored filtered output. An optical transmissive-type filter prepared in accordance with certain aspects of the present disclosure comprises a high index dielectric material comprising silicon nitride ($Si_3N_4$) having a thickness of about 60 nm for generating a blue colored filtered output, a thickness of about 80 nm for generating a green colored filtered output, and a thickness of about 110 nm for generating a red colored filtered output. Lastly, another optical transmissive-type filter prepared in accordance with other aspects of the present disclosure comprises a high index dielectric material comprising zinc selenide (ZnSe). The dielectric material has a thickness of about 30 nm for generating a blue colored filtered output, a thickness of about 50 nm for generating a green colored filtered output, and a thickness of about 80 nm for generating a red colored filtered output.

FIGS. 10A-10C show normal incidence (incident angle of 0°) for concurrent red, green, and blue filtering. FIG. 10A has a comparative example of the low refractive index dielectric material ($SiO_2$). FIG. 10B shows concurrent red, green, and blue filtering for the high index ZnSe dielectric material prepared in accordance with certain aspects of the inventive technology, while FIG. 10C shows red, green, and blue light filtering where the high index dielectric material is $Si_3N_4$ of a filtering device prepared in accordance with certain aspects of the inventive technology. Overall transmission levels for red, green, and blue filtered light outputs are greatest for the high index $Si_3N_4$ dielectric material and the low index silicon dioxide ($SiO_2$) dielectric material. However, as discussed above, the low index silicon dioxide dielectric material suffers from high levels of wavelength shift depending on the incident viewing angle (e.g., angle dependence).

Simulations of reflection-type optical filter assemblies are shown in FIGS. 11A-11C, where wavelength versus reflection demonstrates the angle dependence of a filtered magenta light output. The optical filters have structures like those described above, with silver reflective layers and a silica substrate. FIG. 11A has a low refractive index dielectric material ($SiO_2$) at a thickness of about 130 nm to provide a filtered magenta reflected light output (with incident angles ranging from 0 to 80°). FIG. 11B has a high index dielectric material of n=2.2 for ZnSe at a thickness of about 50 nm to provide a filtered magenta light output (with incident angles ranging from 0 to 80°). Lastly, FIG. 11C includes a high refractive index dielectric material ($Si_3N_4$) (n=2.0) at a thickness of about 80 nm to provide a filtered magenta light output (with incident angles ranging from 0 to 80°).

As can be seen, the lowest refractive index dielectric material (silicon dioxide in FIG. 11A) exhibits the greatest wavelength shift for a reflection-type filter when the incident angle increases from 0 to 80° where the shift is about 130 nm. The high refractive index dielectric material ($Si_3N_4$) in FIG. 11C has a wavelength shift of about 80 nm as the incident angle increases from 0 to 80°, while the highest refractive index dielectric material (ZnSe) in FIG. 11B has a wavelength shift of only about 50 nm as the incident angle increases from 0 to 80°.

FIGS. 12A-12D show comparative multi-colored (yellow-magenta-cyan) reflection interference filters made in accordance with certain variations of the present disclosure. FIGS. 12A-12C compare wavelength versus reflection for reflection-type optical filter assemblies having asymmetric layer structures. FIG. 12D shows respective thicknesses for each dielectric material in the filter assembly to achieve yellow, magenta, and cyan light filtering in the reflective filter. For example, the relatively low index dielectric material comprising silicon dioxide has a thickness of about 100 nm for generating a yellow colored filtered output, a thickness of about 130 nm for generating a magenta colored filtered output, and a thickness of about 170 nm for generating a cyan colored filtered output. A high index dielectric material prepared in accordance with certain aspects of the present teachings comprising silicon nitride ($Si_3N_4$) has a thickness of about 60 nm for generating a yellow colored filtered output, a thickness of about 80 nm for generating a magenta colored filtered output, and a thickness of about 110 nm for generating a cyan colored filtered output. Lastly, another optical filter prepared in accordance with certain aspects of the present teachings has a high index dielectric material comprises zinc selenide (ZnSe) and has a thickness of about 30 nm for generating a yellow colored filtered output, a thickness of about 50 nm for generating a magenta colored filtered output, and a thickness of about 80 nm for generating a cyan colored filtered output.

FIGS. 12A-12C show normal incidence (incident angle of 0°) for concurrent yellow, magenta, and cyan filtering. FIG. 12A has the comparative example of a low refractive index dielectric material ($SiO_2$). FIG. 12B shows concurrent yellow, magenta, and cyan filtering for the high index ZnSe dielectric material, while FIG. 12C shows yellow, magenta, and cyan light filtering where the high index dielectric material is $Si_3N_4$. Overall reflection levels for yellow, magenta, and cyan filtered light outputs are greatest for the high index $Si_3N_4$ dielectric material and the low index silicon dioxide ($SiO_2$) dielectric material. However, as discussed above, the low index silicon dioxide dielectric material suffers from high levels of wavelength shift depending on the incident viewing angle (e.g., angle dependence).

FIGS. 13A-13D show comparative multi-colored (yellow-magenta-cyan) reflection interference filters made in accordance with certain variations of the present disclosure to have reduced angle dependence. FIGS. 13A-13C compare wavelength versus reflection for reflection-type optical filter assemblies having asymmetric layer structures. FIG. 13D shows respective thicknesses for each dielectric material in the filter assembly to achieve yellow, magenta, and cyan light filtering in the reflective filter. For example, the relatively low index dielectric material comprising silicon dioxide has a thickness of about 110 nm for generating a yellow colored filtered output, a thickness of about 140 nm for generating a magenta colored filtered output, and a thickness of about 180 nm for generating a cyan colored filtered output. A high index dielectric material prepared in accordance with certain aspects of the inventive technology comprising silicon nitride ($Si_3N_4$) has a thickness of about 70 nm for generating a yellow colored filtered output, a thickness of about 90 nm for generating a magenta colored filtered output, and a thickness of about 120 nm for generating a cyan colored filtered output. Lastly, another high index dielectric material comprises zinc selenide (ZnSe) and has a thickness of about 45 nm for generating a yellow colored filtered output, a thickness of about 60 nm for generating a magenta colored filtered output, and a thickness of about 85 nm for generating a cyan colored filtered output.

The two reflectors (reflective layers) can be made of different structures or materials. For example for cost effectiveness the bottom reflector in the reflective color filter can be replaced by thicker aluminum (Al) metal and the device performance does not change significantly. FIGS. 13A-13C show normal incidence (incident angle of 0°) for concurrent yellow, magenta, and cyan filtering. FIG. 13A has the low refractive index dielectric material ($SiO_2$). FIG. 13B shows concurrent yellow, magenta, and cyan filtering for the high index ZnSe dielectric material, while FIG. 13C shows yellow, magenta, and cyan light filtering where the high index dielectric material is $Si_3N_4$. Overall reflection levels for yellow, magenta, and cyan filtered light outputs are greatest for the high index $Si_3N_4$ dielectric material and the low index silicon dioxide ($SiO_2$) dielectric material. However, as discussed above, the low index silicon dioxide dielectric material suffers from high levels of wavelength shift depending on the incident viewing angle (e.g., angle dependence).

Certain embodiments of the present teachings can achieve both transmission and reflection color filtering simultaneously. FIGS. 14A-14B show a transmission and reflection filter assembly in accordance with the present disclosure having an asymmetric layer architecture comprising air, a first reflective layer comprising silver having a thickness of about 20 nm, a high refractive index dielectric material (e.g., $Si_3N_4$), a second reflective layer comprising silver having a thickness of about 20 nm, and a glass substrate, by way of non-limiting example. The filter assembly shows red-blue-green transmissive filtering in FIG. 14A and yellow-magenta-cyan reflective filtering in FIG. 14B.

In the embodiments described thus far, an interference filter assembly exhibits minimal angle dependence and may comprise a dielectric material having a refractive index of greater than about 1.5 disposed between a pair of parallel reflective surfaces. Each of the reflective surfaces optionally comprises a metal. Such a filter assembly is capable of transmitting a portion of an electromagnetic spectrum to generate a filtered output having a predetermined range of wavelengths that exits the filter assembly, wherein the filtered output has a predetermined range of wavelengths and displays minimal angle dependence.

The interference filter assembly comprises a dielectric material. In certain variations, such a dielectric material has a relatively high refractive index, for example, greater than about 1.5. In certain aspects, a dielectric material has a relatively high refractive index preferably greater than or equal to 2, optionally greater than or equal to about 3, and in certain variations, greater than or equal to about 4. The interference filter assembly also comprises a pair of parallel reflective surfaces, where each reflective surface comprises a metal. The dielectric material is disposed between the pair of parallel reflective surfaces.

In various aspects, the present disclosure also provides methods for making an interference filter assembly having reduced angle dependence according to any of the embodiments described above or herein. FIG. 15 shows certain processes that can be used to fabricate filter assemblies with different color pixels in accordance with certain aspects of the present teachings for a visual display. First, a resist material 400 is applied to a surface of a high index dielectric material 402 that is disposed on a first reflective surface layer 404 (e.g., comprising metal like silver or aluminum) over a transmissive substrate 406. In Step 1, a mold 400 has a first region 412 having a first depth, a second region 414 having a second depth, and a third region 416 having a third depth is imprinted with applied pressure into the resist material 400. Suitable polymeric resist materials include a wide range of thermoplastic polymers that can be deformed by heating; or precursor materials that can be UV or thermal cured after pressing, which are well known in the art. Materials for forming these structures are described in U.S. Pat. No. 7,648,767 to Fu, et al. entitled "MATERIAL COMPOSITION FOR NANO- AND MICRO-LITHOGRAPHY" and U.S. Patent Publication No. 2009/0256287 (application Ser. No. 12/421,333 filed on Apr. 9, 2009) to Fu, et al. entitled "UV Curable Silsesquioxane Resins For Nanoimprint Lithography," each of which is incorporated herein by reference in its respective entirety. After the mold 410 is removed, the resist material 400 has different heights corresponding to the first depth of the first region 412, second depth of the second region 414, and third depth of the third region 416. The resist material may be further cured or treated.

In Step 2, an etching process, such as a reactive ion etch can be conducted on the surface of the resist material 400 to transfer the depth contrast pattern to the high index dielectric layer 402 below. This imparts distinct thicknesses to the high index dielectric material 402 that corresponds to different spectral filters, which will enable the filter to be a multi-colored or multiple-spectrum filter. Further, the etching process optionally removes the polymeric resist material 400 from the high index dielectric material 402 or it may be removed by a developer or solvent, as is well known in the art.

In Step 3, a thin metal layer 420 is applied to an upper surface of each stepped portion of the high index high index dielectric to form the second reflective surface. As such, a multi-colored filter assembly is created, where a first region 430 of the filter assembly has the high index dielectric layer 402 at a first thickness corresponding to a first filtered color, such as blue, while a second region 440 has the high index dielectric layer 402 at a second thickness greater than the first region's 430, corresponding to a second filtered color, such as green. Lastly, a third region 450 of the filter assembly has the high index dielectric layer 402 at a third thickness corresponding to a third filtered color, such as red. As appreciated by those of skill in the art, such fabrication techniques can be used to make a plurality of distinct colored filters or may be used to make a colored filter assembly for a single color or spectral wavelength range.

With renewed reference to FIGS. 1 and 2, an exemplary optical spectrum filtering device 20 includes the filter assembly 30. In such a variation, the filter assembly 30 includes a pair of parallel reflective surfaces 42, 46 sandwiching at least one dielectric material layer 44. In certain variations, the reflective surfaces may comprise a reflective material like a metal, such as silver, aluminum, or combinations thereof (for example, one reflective surface may comprise silver and another reflective surface of the pair comprises aluminum). While in certain variations, selection of a metal like silver for both reflector surfaces may be preferred, in alternative aspects, one of the reflectors (e.g., the bottom reflector in the reflective color filter) can be replaced by thicker aluminum (Al) metal, while the other reflective surface comprises silver, without experiencing any significantly diminished performance. In certain embodiments, the transmissive substrate(s) surrounding the pair of parallel reflective surfaces comprise silicon dioxide. In other variations, one or both of the parallel reflective surfaces may comprise a stack of dielectric layers having a refractive index contrast, as discussed in greater detail below.

In various aspects, the dielectric material comprises a high refractive index material or materials, which in accordance with the inventive principles minimizes angle dependence of a spectrum filtering device. For example, a suitable dielectric material has a refractive index of greater than about 1.5; optionally greater than or equal to about 1.6; optionally greater than or equal to about 1.7; optionally greater than or equal to about 1.8; optionally greater than or equal to about 2.0; optionally greater than or equal to about 2.2; optionally greater than or equal to about 2.5; optionally greater than or equal to about 3; optionally greater than or equal to about 3.5; optionally greater than or equal to about 4; and in certain variations, may be greater than or equal to about 5.

Suitable high refractive index materials for use in accordance with the present disclosure include by way of non-limiting example, silicon nitride ($Si_3N_4$) having a refractive index of 2.0, zinc selenide (ZnSe) having a refractive index of about 2.5, zinc oxide (ZnO) having a refractive index of about 2.0, zirconium oxide ($ZrO_2$) having a refractive index of about 2.2, and titanium oxide ($TiO_2$) having a refractive index of about 2.2. Such high refractive index materials may be used individually or as combined.

Other contemplated high index materials are optical metamaterials. Metamaterials are synthetic materials engineered to have properties based on their structure, rather than composition of the material itself, by using small inhomogeneities to create effective macroscopic behavior, which are generally anisotropic and inhomogeneous. Many such optical metamaterials have high refractive indices or can be designed to have high refractive indices while still having minimal absorption in the target spectral range, for example metamaterials may a refractive index of greater than or equal to about 2; optionally greater than or equal to about 3, optionally greater than or equal to 3.5, optionally greater than or equal to about 4, and in certain aspects, optionally up to or exceeding a refractive index of 5. In certain additional embodiments described below, such metamaterials can be used in alternative optical filtering device embodiments to provide color filtering with minimal angle dependence.

Other suitable options for the high index dielectric material type materials include polymers having a high refractive index, such as polystyrene, which has a refractive index of about 1.6; or liquid crystal materials or ferroelectric polymers or polymer matrices having an index of about 2.0. In other variations, the dielectric material may be a polymeric matrix comprising a polymer and a plurality of nanoparticles having a high refractive index. By way of non-limiting example, a polymeric matrix for a dielectric material may comprise polystyrene as the polymer and the homogeneously distributed plurality of nanoparticles may comprise zirconia ($ZrO_2$) or any of the other high refractive index materials in particulate form described above.

In certain aspects, particularly those where the spectrum filtering is in the visible light range (color filtering), the dielectric material can be selected from the group consisting of: silicon nitride ($Si_3N_4$), zinc selenide (ZnSe), zinc oxide (ZnO), zirconium oxide ($ZrO_2$), and titanium oxide ($TiO_2$). In other variation, for example those where the predetermined range of wavelengths of the filtered output that exits the filter assembly is in the infrared spectrum range, the dielectric material is selected from the group of semiconductors consisting of silicon (Si), gallium arsenide (GaAs), indium phosphide (InP), cadmium sulfide (CdS), and combinations thereof.

In certain aspects, the dielectric material may comprise a single material, while in other aspects; the dielectric material may comprise a plurality of distinct layers having different compositions. As noted above, a thickness of the dielectric layer (or plurality of layers) is preferably sub-wavelength for the wavelengths of the target spectrum and in combination with other variables well known to those of skill in the art, determines the wavelength of light filtered from a Fabry-Perot-based optical interference filter.

Further, in certain alternative variations, a Fabry-Perot based optical filtering device can have a tunable filter. Thus, a high index dielectric material between a pair of reflective surfaces (e.g., two reflection mirrors) can be tunable in response to an external field. For example, a high index dielectric material may have electric-field tunable characteristics, such as liquid crystals (which typically have larger reflective index too), and certain types of piezoelectric materials (e.g., polyvinylidenefluoride (PVDF) and its copolymers), which respond to application of electric fields to change physical properties of the dielectric materials.

In yet other variations of the present disclosure, an alternative embodiment of an optical spectrum filtering device comprises an interference filter assembly that generates a filtered electromagnetic energy output having minimal angle dependence is provided. By way of non-limiting example, such a filter device can be Fabry-Perot etalon that filters light, while further having a dielectric layer to minimize angle dependence of the filtered light in accordance with the present teachings.

FIG. 18 shows a sectional view of an exemplary alternative embodiment of an optical filter assembly 500 having minimal viewing angle dependence and using a resonator filter assembly comprising a high effective refractive index optical metamaterial. The optical filter assembly comprises a substrate 502 adjacent to a transparent dielectric layer 504. The substrate 502 and the transparent dielectric layer 504 may comprise silica ($SiO_2$) or any of the other transmissive materials discussed previously in the context of the earlier embodiments above. A conductive nano-scale or micro-scale conductive/metallic wire grid or grating structure 506 is disposed over the dielectric layer 504. The conductive materials may be any of those described above, such as aluminum or silver, by way of non-limiting example.

By "grating structure" it is meant that a high conductive material, like metal or graphene, is used to form the structure, which comprises one or more openings therethrough to permit certain wavelength(s) of light to pass through. For example, in certain preferred aspects, a grating structure may comprise a plurality of conductive material rows or discrete regions spaced apart, but substantially parallel to one another. The spacing between adjacent rows defines a plurality of openings through which certain wavelengths of light may pass. The grating may also comprise a second plurality of conductive rows having a distinct orientation from the first plurality of rows that are likewise spaced apart, but substantially parallel to one another. The first and second plurality of rows may intersect or contact one another at one or more locations to form a grid or mesh structure. It should be noted that in preferred aspects, the grating comprises at least two rows to form at least two openings, but that the number of rows and layers of distinct grating structures are not limited to only two, but rather may comprise multiple different designs and layers. Further, as described below, while the adjacent conductive rows or other regions of the plurality are preferably distanced at a sub-wavelength distance from one another (a distance of less than the target wavelength or range of wavelengths), each respective pair of rows may define a distinct distance for each opening (or slit diameter) there between and thus will permit different wavelengths of light to travel there through. Thus, a grating structure where the conductive rows optionally comprise a conductive metal or graphene may be employed as a resonator structure in an optical polarizer, by way of non-limiting example.

Such grating structures can have a variety of different shapes tailored to the end application; by way of example; a suitable wire grid polarizer has a period (e.g., interval/distance between a first feature and a second feature, see period "d" in FIG. 18, for example) of less than about 1 µm suitable for polarizing and/or filtering electromagnetic energy waves in the visible (wavelength ranging from about 400 nm to about 800 nm) to IR (wavelengths ranging from about 0.75 µm to about 1 mm, including near-IR at about 1 µm to about 10 µm). Subwavelength grating structures are particularly desirable for plasmonic resonator devices, which means that one or more of the grating dimensions is smaller than a wavelength or range of wavelengths that are filtered by the device (e.g., a sub-wavelength grating means a grating structure for visible light having one or more dimensions that are less than a wavelength of 0.7 µm, preferably less than about 200 nm). Wire grid or grating structures according to the present teachings in the form of sub-wavelength metallic gratings are an attractive alternative to conventional polarizer filters, because they provide a high extinction ratio between the transmitted transverse magnetic (TM) polarized light and the reflected transverse electric (TE) polarized light over a wide wavelength range.

In certain aspects, the filtering occurs at least in part via an optical resonance process. A display device may comprise a display pixel that comprises a plasmonic resonator structure for color filtering via optical resonance. The plasmonic resonator structure comprises an electrically conductive grating structure that naturally defines two parallel reflective surfaces. The electrically conductive grating structure comprises at least two openings capable of transmitting a portion of an electromagnetic spectrum generated by the display device. The electromagnetic waves can transmit through the two or more openings to generate a filtered and polarized output having a predetermined range of wavelengths via optical resonance. In certain variations, such a display device is a liquid crystal display (LCD) device. The resonator structure can serve as a transparent conductive electrode and a polarizer in a pixel for such an LCD display.

The grid or grating pattern of metal rows 506 formed on dielectric layer 504 defines a period "d" (a distance defined from a first side 514 of a first row 515 of the plurality of metal rows 506 to a first side 516 of a second adjacent row 517 of the metal rows 506). Each row 506 has a thickness of "L." A distance "a" between adjacent rows 515, 517 is considered an opening (or aperture or slit) or gap 512. It should be noted that distance "d" may vary through the grating pattern 506. A metal row 506 has a height "L" and a width of each metal row 506 is "w." A duty cycle is defined by f=w/d. Periodicity refers to at least one period (d) between a pair of rows in the grating pattern, but where there are more than two openings typically refers to a repeating period (d) in the grating pattern. Thus, a high transparency resonator structure, for example, can be designed by adjusting metal row 506 width (w) and period (d) so that different wavelengths of light can be transmitted through openings 512 (a). High conductance can likewise be achieved by adjusting the thickness (L) of the film of metal material forming rows 506. Such a grating pattern 500 provides a highly flexible design that can be readily tailored for different performance criteria.

In certain aspects, a reflection-type color filter device may comprise such a conductive metal grating pattern. In certain aspects, a thick conductive metal layer can be applied to a substrate (or optionally a dielectric layer). The substrate may be patterned or substantially planar prior to applying the metal. A plurality of openings, for example, slits, may be drilled, etched, or otherwise formed in the thick metal layer. In certain aspects, a dielectric material film, like a silicon dioxide can be patterned in the form of nanogratings defining a plurality of rows or fins having high aspects ratios. Then, the nanogratings are back-filled by sputtering with a conductive metal. See for example, FIGS. 19A and 19B, described further herein.

In one exemplary embodiment, the gap 512 (a) between rows 506 is about 40 nm, a period (d) between rows 506 is greater than or equal to about 170 nm, and the height (L) or thickness of each metal row 506 (comprising aluminum, for example, is about 70 nm. In another embodiment, the gap 512 (a) between rows 506 is about 40 nm, a period (d) between rows 506 is greater than or equal to about 190 nm, and the height (L) or thickness of each metal row 506 (comprising aluminum, for example, is about 80 nm. In yet another exemplary embodiment, the gap (a) 512 between rows 506 is about 40 nm, a period (d) between rows 506 is greater than or equal to about 190 nm, and the height (L) or thickness of each metal row 506 (comprising aluminum, for example, is about 110 nm.

By way of further background, FIG. 23 shows a schematic of a design principle for a conductive grating structure used as an optical metamaterial of an optical filter assembly having subwavelength electromagnetic resonances, where the conductive grating structure is subwavelength, exhibits a large effective refractive index, and is capable of transmitting transverse magnetic (TM) polarized light, while reflecting transverse electric (TE) polarized light waves. High refractive index metamaterials can be created with such grating structures due to the existence of subwavelength propagating modes in metallic systems. Conductive grating structures formed of metal films with a periodic arrangement of openings or gaps can be regarded as a dielectric layer with a frequency-independent effective refractive index. The effective index in this system is controlled by geometry, and therefore refractive indices that are arbitrarily high can be created, which are particularly useful in certain variations of the low angle dependence optical filters. Thus, in employing such a grating structure design as a metamaterial, an effective refractive index is controlled by the geometry of the metal films, is positive, frequency independent, and can be designed to be arbitrarily large is possible.

With reference to FIG. 23, a thick metal film 600 has one-dimensional periodic cut-through slits or openings 602. In the openings, regardless of how small the width ("a") is, there exists a propagating TEM mode, with the electric field pointing in the x direction. The presence of this mode permits perfect transmission of light through subwavelength slit arrays. As shown "a" is a width of the opening or a gap between respective metal rows 604, "d" is the periodicity, and "L" is a thickness of a metal film. The effective refractive index is believed to be $$n \equiv \frac{d}{a},$$

while the thickness $$\bar{L} \equiv \frac{L}{n}.$$

The properties of the metal film 600 for the TM polarization are believed to asymptotically approach those of a dielectric layer with a uniquely defined refractive index "n" and a width or thickness $\bar{L}$. A large ratio thus amounts to a high effective refractive index n. Thus, transmission properties of a metal film 600 with slits or openings 602 appear to be asymptotically identical to those of a dielectric slab with the refractive index $$n = \frac{d}{a}$$

and a thickness of $$\bar{L} \equiv \frac{L}{n}.$$

This correspondence of the grating structure to the dielectric slab desirably remains valid for all oblique incident angles as well. In this regard, the thickness L of the metal film 600, period d and gap width a of each opening 602 can be employed to design a desirably high refractive index material that minimizes angle dependence when color filtering.

Design of such conductive grating structures having desired refractive indices is described in Shen et al., "Mechanism for Designing Metallic Metamaterials with a High Index of Refraction," Physical Review Letters, 94 (19), pp. 197401-1:4 (May 20, 2005), incorporated herein by reference in its entirety. A spectrum filter according to certain aspects of the inventive technology can be obtained by fabricating a sub-wavelength metallic grating on top of a set of dielectric layers, which in certain aspects is described in Kaplan et al, "High Efficiency Resonance-Based Color Filters with Tunable Transmission Bandwidth Fabricated Using Nanoimprint Lithography," Appl. Phys. Lett. 99, 143111, 2011, incorporated herein by reference. FIGS. 19A and 20A show scanning electron microscopy (SEM) images of two distinct embodiments of high refractive index conductive mesh grating nanostructures (optical metamaterials) fabricated on a substrate (scale bars are 400 nm and 300 nm respectively).

In FIG. 19A, the nanograting structure has a period of about 220 nm and in FIG. 20A, the nanograting structure has a period of about 180 nm. FIGS. 19B and 20B shows wavelength versus reflection of transverse magnetic (TM) polarized light for each of these structures at respective incident viewing angles of 45°, 55°, 65°, and 75°. As can be seen, the 180 nm period structure in FIG. 20A exhibits less angle dependence (less of a shift in wavelength at respective viewing angles) than the structure in FIG. 19A. However, such nano-grating structures can be designed and optimized to reduce angle dependence based upon the desired wavelengths of light to be filtered (reflected or transmitted) and thus provide the capability to form superior optical filter devices with minimal viewing angle dependence.

Furthermore, in certain aspects of the present disclosure, the filter assembly 500 can comprise a material 520 that fills and is embedded in the gaps 512 (or openings or slits) and covers the metal grating structure 506 in FIG. 18. Such a material 520 may be a second dielectric material, such as any of the materials discussed above, like aluminum oxide ($Al_2O_3$), silicon nitride ($Si_3N_4$), or silicon dioxide ($SiO_2$) or various polymers that have dielectric properties that are known in the art. Thus, as shown in FIG. 18, another design of an angle-tolerant Fabry-Perot color filter is provided that employs a large effective refractive index of a sub-wavelength metallic grating where the electromagnetic radiation or light resonantly transmits through the nano-slits or openings in the grating. A dielectric material (which may be a second dielectric material in addition to the optional layer below the nano-grating) can be embedded in the openings or slits of the metallic grating structure. Furthermore, such an embodiment advantageously provides a polarized color filter, which transmits of transmitting transverse magnetic (TM) polarized light, while reflecting transverse electric (TE) polarized light waves. In certain variations, the transmission of TE is less than 1%.

Thus, in certain aspects, an optical spectrum filtering device is provided that comprises a resonance filter assembly displaying minimal angle dependence. The filter assembly comprises a dielectric material and a resonator structure comprising an electrically conductive metal grating structure. The electrically conductive metal grating structure comprises at least two openings capable of transmitting a portion of an electromagnetic spectrum to generate a filtered and polarized output having a predetermined range of wavelengths via optical resonance. The polarized output is preferably transmitted transverse magnetic (TM) polarized light, while the transverse electric (TE) polarized light waves is substantially reflected. Use of such a polarizer optical filter device can provide a simplified LCD structure, by eliminating the need for a polarizer structure. It also produces polarized transmission, which is advantageous for LCD panel application because one polarizer sheet can be eliminated.

In certain aspects, methods of reducing angle dependence of an optical spectrum filtering device are provided by the present teachings. In one variation, the method comprises incorporating a resonator filter assembly that comprises a dielectric material and a resonator structure comprising an electrically conductive metal grating structure. The electrically conductive metal grating structure comprises at least two openings capable of transmitting a portion of an electromagnetic spectrum to generate a filtered and polarized output having a predetermined range of wavelengths via optical resonance. Thus, the filter assembly has minimal angle dependence and is capable of generating a filtered output having a predetermined range of wavelengths that deviate less than or equal to 50 nm when the filter assembly is observed from incidence angles ranging from 0 to 90°.

Comparative simulation results of wavelength versus transmission are shown in FIG. 21 for a structure similar to that in FIG. 18, having a dielectric material of silicon dioxide ($SiO_2$) embedded in the one or more openings or slits of a grating structure (dimensions of grating structure). The embedded dielectric material can be any conventional dielectric material. The optical metamaterial formed by the conductive grating structure embedded with a dielectric material may thus have an overall effective refractive index of greater than about 1.5; optionally greater than or equal to about 1.75; optionally greater than or equal to about 2; optionally greater than or equal to about 3; optionally greater than or equal to about 4.

A blue color filter is designed to have an optical metamaterial grating structure comprising aluminum with a gap a of about 40 nm, a period (d) of about 170 nm, and a thickness or height (L) of about 70 nm, where the dielectric layer and the substrate comprise silicon dioxide ($SiO_2$) and the top dielectric layer filling the gaps between grating openings is $Al_2O_3$. Other dielectric materials with higher refractive indices, such as $Si_3N_4$, can also be employed as the material filling the openings in the conductive grating structures. A green color filter is designed to have a grating structure comprising aluminum with a gap α of about 40 nm, a period (d) of about 190 nm, and a thickness or height (L) of about 80 nm, where the dielectric layer and the substrate comprise silicon dioxide ($SiO_2$) and the top dielectric layer filling the gaps between grating openings is $Al_2O_3$ has an effective index of about 1.76. Finally, a red color filter is designed to have a grating structure comprising aluminum with a gap α of about 40 nm, a period (d) of about 190 nm, and a thickness or height (L) of about 110 nm, where the dielectric layer and the substrate comprise silicon dioxide ($SiO_2$) and the top dielectric layer filling the gaps between grating openings is $Al_2O_3$ has an effective index of about 1.45. As can be seen from FIG. 21, each of the blue, green, and red filters have transmission rates of at least 75% at different wavelengths of interest.

FIG. 22 shows an example of the red color filter design discussed just above with a calculated map of reflection and demonstrates a strong angle tolerance up to 60 degrees incident viewing angle. The angle independence of these filters is believed to be due to the effective index of the metal slit structure, which is increased by a factor of (d/a) for ideal metal (i.e., the inverse duty cycle). Because the effective refractive index of the layer is enhanced by a factor of d/a where d is the period of the grating and a the slit width, light is refracted close to normal direction inside the effective Fabry-Perot cavity, even if light is incident obliquely. In this structure, having a design like that shown in FIG. 18 for example, the two surfaces of the metallic grating naturally provide the reflecting surfaces. In various aspects, the present teachings provide an optical spectrum filtering device comprising an interference filter assembly having reduced angle dependence according to any of the embodiments described above or herein.

Furthermore, in certain variations, an optical spectrum filtering device may be a Fabry-Perot type color filter, which has minimal angle-dependence in accordance with the present teachings and can further optionally be made with tunable properties. For example, the filtered color output having a predetermined range of wavelengths (color spectrum) can be electrically tunable by using high-index materials whose refractive indices can be modified by application of an electric field. Furthermore, the pair of parallel reflective surfaces each comprising a metal can conveniently function as the electrodes for the application of electrical voltage. FIG. 16 shows an example of transmission color spectrum tuned from blue to green by the application of electric field from such a filtering device (wavelength versus transmission for a transmission type tunable Fabry-Perot-based spectrum filter comprising a liquid crystal dielectric). FIG. 17 shows a schematic of liquid crystal refractive index versus applied voltage for use as a dielectric material in a tunable Fabry-Perot-based spectrum filter according to certain aspects of the present teachings. Suitable materials are taught in Zhang et al., "Novel Tunable Liquid Crystal Fabry-Perot Filters For Fiber-Optical Systems," Prog. SPIE. 0277 (2001), which is incorporated herein by reference in its entirety. Such a property can also be used to control the transmission intensity of a color pixel if the backlight units (light source) are made by light emitting diodes with specific emission spectra, for example.

As discussed above, in certain embodiments, the optical spectrum filtering device can have a filter assembly architecture that is symmetric. Such symmetry of layers in the filter assembly is believed to increase the overall reflection or transmission of filtered wavelengths through the optical filtering device.

In various aspects, the present disclosure also provides methods of reducing angle dependence for an optical spectrum filtering device. The method comprises incorporating a dielectric material having a refractive index of greater than about 1.5 into an interference filter assembly comprising a pair of parallel reflective surfaces, as described above. Particularly preferred dielectric materials selected for use in the filter assembly have a refractive index of greater than or equal to about 1.6, optionally greater than or equal to about 1.7; optionally greater than or equal to about 1.8; optionally greater than or equal to about 2.0; optionally greater than or equal to about 2.2; optionally greater than or equal to about 2.5; optionally greater than or equal to about 3; optionally greater than or equal to about 3.5; optionally greater than or equal to about 4; and in certain variations, may be greater than or equal to about 5.

Such a filter assembly generates a filtered output having a predetermined range of wavelengths that have minimal deviation when the filter assembly is observed from incidence angles ranging from 0 to 90°, therefore, the angle dependence of the filter assembly is reduced. For example, minimal deviation of a filtered output can be expressed as minimal angle dependence.

In certain variations, minimal angle dependence of an optical filtering device corresponds to a filtered output having a predetermined range of wavelengths that varies less than or equal to about 80 nm; optionally less than or equal to 70 nm; optionally less than or equal to 60 nm when comparing a difference between a first wavelength at an incidence angle of 0° as compared to a second wavelength at an incidence angle of 90°. In certain particularly advantageous variations, minimal angle dependence of an optical filtering device corresponds to a filtered output having a predetermined range of wavelengths that varies (e.g., has a wavelength shift) of less than or equal to less than or equal to 50 nm; optionally less than or equal to about 45 nm; optionally less than or equal to 40 nm; optionally less than or equal to 35 nm; optionally less than or equal to 30 nm; based on a range of incidence potential angles (when comparing a difference between a first wavelength of interest observed at an incidence angle of 0° as compared to a second wavelength observed at an incidence angle of 90°).

In certain other variations, the first and second reflective surfaces forming the parallel pair of reflective surfaces of the Fabry-Perot based optical filter can instead be made of other materials as well. For example, in other aspects, a spectrum filtering device may have minimal angle-dependent variation by using a high refractive index defect cavity layer sandwiched by two reflectors comprising distributed Bragg reflectors (DBRs) or 1-dimensional photonic crystal structures possessing reflection properties within certain a wavelength range. DBRs are typically formed of multiple layers of alternating materials having different refractive indices, or have periodic variation of a particular property (such as height), resulting in periodic variation in the effective refractive index of the DBR. Each layer boundary causes a partial reflection of an optical wave. Typically, photonic crystals are composed of periodic dielectric or metallo-dielectric nanostructures with regularly repeating internal regions of high and low dielectric constant. A one-dimensional photonic crystal has layers of different dielectric constants deposited or adhered together to form a band gap in a single direction, such as a Bragg grating.

In various aspects, optical spectrum filtering devices according to the present teachings are particularly suitable for use as a color filter, for example, a pixel, for a display device. Thus, the optical spectrum filtering devices having minimal angle dependence are particularly useful in applications such as flat panel displays, liquid crystal displays, projection displays, eye-wear displays, complementary metal-oxide-semiconductor (CMOS) image sensors, light emitting diodes, and the like.

Accordingly, the present technology provides a metal-dielectric-metal resonator structure or a metal grating-dielectric resonator structure that can provide spectrum filtering function without exhibiting viewing angle dependency, including for both transmission and reflection types. The techniques described above are generally applicable to any flat panel display, either transmission or reflection type, especially for high input power applications, such as three dimensional (3-D) projection displays. The design of the thin film filter structures can simplify the color filter fabrication, and recycle the reflected light for overall higher transmission efficiency.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An optical spectrum filtering device comprising:
an interference filter assembly comprising a dielectric material having a refractive index of greater than about 1.5 disposed between a pair of parallel reflective surfaces; wherein the filter assembly is capable of transmitting a portion of an electromagnetic spectrum to generate a filtered output having a predetermined range of wavelengths that displays minimal angle dependence so that the predetermined range of wavelengths varies less than or equal to about 50 nm from an incidence angle of 0 to an incidence angle of 90°.

2. The optical spectrum filtering device of claim 1, wherein each of the parallel reflective surfaces comprises a metal selected from the group consisting of: silver, aluminum, and combinations thereof.

3. The optical spectrum filtering device of claim 1, wherein each of the parallel reflective surfaces comprises a stack of dielectric layers having a refractive index contrast.

4. The optical spectrum filtering device of claim 1, wherein the dielectric material forms part of an optical metamaterial having an effective refractive index of greater than or equal to about 2.

5. The optical spectrum filtering device of claim 4, wherein the optical metamaterial comprises a metallic grating structure comprising a plurality of subwavelength slits, wherein the dielectric material is embedded in the subwavelength slits.

6. The optical spectrum filtering device of claim 1 that is a transmission filter, so that the filter assembly is capable of transmitting the portion of the electromagnetic spectrum through one of the pair of parallel reflective surfaces into the dielectric material to another of the pair of parallel reflective surfaces where it is transmitted, so that the portion of the electromagnetic spectrum enters on a first side of the filter assembly and the filtered output exits on a second side opposite to the first side.

7. The optical spectrum filtering device of claim 6, wherein the predetermined range of wavelengths of the filtered output that exits the filter assembly is in a visible light range and has a color selected from the group consisting of: red, green, and blue.

8. The optical spectrum filtering device of claim 1 that is a reflection filter, so that the filter assembly is capable of transmitting the portion of the electromagnetic spectrum through one of the pair of parallel reflective surfaces into said dielectric material to another of the pair of parallel reflective surfaces, where it is reflected so that the portion of the electromagnetic spectrum enters on a first side of the filter assembly and the filtered output exits on the first side of the filter assembly.

9. The optical spectrum filtering device of claim 8, wherein the predetermined range of wavelengths of the filtered output that exits the filter assembly is in a visible light range and has a color selected from the group consisting of: cyan, magenta, and yellow.

10. The optical spectrum filtering device of claim 1, wherein the dielectric material is selected from the group consisting of: aluminum oxide ($Al_2O_3$), silicon nitride ($Si_3N_4$), zinc selenide (ZnSe), zinc oxide (ZnO), zirconium oxide ($ZrO_2$), and titanium oxide ($TiO_2$).

11. The optical spectrum filtering device of claim 1, wherein the predetermined range of wavelengths of the filtered output that exits the filter assembly is in an infrared spectrum range and the dielectric material is selected from the group consisting silicon (Si), gallium arsenide (GaAs), indium phosphide (InP), and cadmium sulfide (CdS).

12. The optical spectrum filtering device of claim 1, wherein the pair of parallel reflective surfaces comprises a first reflective surface and the filter assembly further comprises a transmissive substrate defining a first side adjacent to the dielectric material, wherein the first reflective surface is disposed on the first side of the transmissive substrate.

13. The optical spectrum filtering device of claim 12, wherein an architecture of the filter assembly is symmetric to enhance transmission or reflection of the filtered output.

14. The optical spectrum filtering device of claim 12, wherein the pair of parallel reflective surfaces comprises a first reflective surface and a second reflective surface sandwiching the dielectric material, wherein a thickness of the dielectric material measured from a second side adjacent to the first reflective surface to an opposite third side adjacent to the second reflective surface determines the predetermined range of wavelengths transmitted through the filter assembly.

15. The optical spectrum filtering device of claim 1, wherein the filter assembly is used as a color filter for a display device or an imaging device.

16. The optical spectrum filtering device of claim 1, wherein the filter assembly is a tunable structure and comprises a dielectric material that has electric-field tunable characteristics.

17. The optical spectrum filtering device of claim 1, wherein the dielectric material has a refractive index of greater than or equal to about 3.

18. An optical spectrum filtering device comprising:
an interference filter assembly comprising an optical metamaterial having a refractive index of greater than about 2 disposed between a pair of parallel reflective surfaces, wherein each reflective surface comprises a metal and the optical metamaterial comprises a metallic grating structure comprising a plurality of subwavelength slits having a dielectric material embedded in the subwavelength slits; and
wherein the filter assembly is capable of transmitting a portion of an electromagnetic spectrum into the dielectric material to generate a filtered output having a predetermined range of wavelengths that exits the filter assembly, wherein the filtered output has a predetermined range of wavelengths and displays minimal angle dependence so that the predetermined range of wavelengths varies less than or equal to about 50 nm from an incidence angle of 0 to an incidence angle of 90°.

19. An optical spectrum filtering device comprising:
an interference filter assembly comprising a high refractive index dielectric material disposed between a pair of parallel reflective surfaces, wherein each reflective surface comprises a distributed Bragg Reflector (DBR) or a 1-dimensional photonic crystal; and
wherein the filter assembly is capable of transmitting a portion of an electromagnetic spectrum into the dielectric material to generate a filtered output having a predetermined range of wavelengths that exits the filter assembly, wherein the filtered output has a predetermined range of wavelengths and displays minimal angle dependence so that the predetermined range of wavelengths varies less than or equal to about 50 nm from an incidence angle of 0 to an incidence angle of 90°.

20. The optical spectrum filtering device of claim 19, wherein the predetermined range of wavelengths varies less than or equal to about 40 nm from an incidence angle of 0 to an incidence angle of 90°.

21. A method of making an optical spectrum filtering device having minimal angle dependence, the method comprising:
applying a polymeric resist material to a dielectric material having a refractive index of greater than about 2 and contacting the polymeric resist with a mold having a predetermined height;
etching the polymeric resist and dielectric material; and
applying a metal over the remaining dielectric material to form an interference filter assembly having the refractive index of greater than about 2 comprising a pair of parallel reflective surfaces, wherein a filtered output from the interference filter assembly generates a predetermined range of wavelengths that displays minimal angle dependence so that the predetermined range of wavelengths varies less than or equal to about 50 nm from an incidence angle of 0 to an incidence angle of 90°.

22. A method of reducing angle dependence of an optical spectrum filtering device, the method comprising:
incorporating a dielectric material having a refractive index of greater than about 1.5 into an interference filter assembly comprising a pair of parallel reflective surfaces, wherein each reflective surface comprises a metal; so that the filter assembly generates a filtered output having a predetermined range of wavelengths that deviates less than or equal to 50 nm when the filter assembly is observed from incidence angles ranging from 0 to 90°.

23. An optical spectrum filtering device comprising:
a resonance filter assembly that displays minimal angle dependence comprising a resonator structure comprising an electrically conductive metal grating structure that forms an optical metamaterial, wherein the electrically conductive metal grating structure comprises at least two openings capable of transmitting a portion of an electromagnetic spectrum to generate a filtered and polarized output having a predetermined range of wavelengths via optical resonance, wherein the predetermined range of wavelengths varies less than or equal to about 50 nm from an incidence angle of 0 to an incidence angle of 90°.

24. The optical spectrum filtering device of claim 23, wherein the at least two openings are subwavelength and the resonator structure comprising the electrically conductive metal grating structure further comprises a dielectric material embedded in the at least two openings.

* * * * *